(12) United States Patent
Ardouin et al.

(10) Patent No.: US 9,710,721 B2
(45) Date of Patent: Jul. 18, 2017

(54) METHOD FOR IN-SCENE COMPENSATION USING WATER VAPOR CONTENT

(71) Applicant: Her Majesty the Queen in Right of Canada, as represented by the Minister of National Defence, Ottawa (CA)

(72) Inventors: Jean-Pierre Ardouin, Sainte-Catherine-de-la-Jacques-Cartier (CA); Vincent Ross, L'Ancienne-Lorette (CA)

(73) Assignee: HER MAJESTY THE QUEEN IN RIGHT OF CANADA, Ottawa (CA)

( * ) Notice: Subject to any disclaimer, the term of this patent is extended or adjusted under 35 U.S.C. 154(b) by 0 days.

(21) Appl. No.: 15/051,223

(22) Filed: Feb. 23, 2016

(65) Prior Publication Data

US 2016/0259962 A1    Sep. 8, 2016

Related U.S. Application Data

(62) Division of application No. 14/103,235, filed on Dec. 11, 2013.

(51) Int. Cl.
    G06K 9/00     (2006.01)
    G06K 9/46     (2006.01)
    G06T 5/00     (2006.01)

(52) U.S. Cl.
    CPC ............ G06K 9/46 (2013.01); G06K 9/0063 (2013.01); G06T 5/007 (2013.01);
    (Continued)

(58) Field of Classification Search
    CPC ............ G06K 9/46; G06K 2009/4657; G06K 9/0063; G06T 2207/30188; G06T 5/007; G06T 2207/10036; G06T 2207/30192
    See application file for complete search history.

(56) References Cited

U.S. PATENT DOCUMENTS 6,665,438 B1*  12/2003  Lin ..................... G06K 9/0063
                                                      382/191
6,909,815 B2   6/2005  Bernstein et al.
(Continued)

OTHER PUBLICATIONS

NPL, Munoz et al., Surface Emissivity Retrieval from Airborne Hyperspectral Scanner Data: Insights on Atmospheric Correction and Noise Removal, IEEE Geoscience and remote sensing letters, vol. 9, No. 2, Mar. 2012.*

(Continued)

*Primary Examiner* — Kim Vu
*Assistant Examiner* — Pinalben Patel
(74) *Attorney, Agent, or Firm* — Moffat & Co.

(57) ABSTRACT

Methods are provided for automatically performing atmospheric compensation of a multi or hyper spectral image. One method comprises transforming at least two endmembers extracted from an image into at-ground reflectance. The transformation may be approximate and/or only in certain spectral bands in order to reduce processing time. A matching component is then located in a spectral library for each of the at least two extracted endmembers. Gain and offset values are then calculated using the at least two matched extracted endmember and spectral library component pairs. At least part of the image is then compensated using the calculated gain and offset values. Another method uses at least one endmember extracted from the image and a black level. Methods for atmospheric compensation using water vapor content of pixels are also provided. In addition, methods for shadow correction of hyper and multi spectral images are provided.

6 Claims, 19 Drawing Sheets

(52) U.S. Cl.
CPC .............. *G06K 2009/4657* (2013.01); *G06T 2207/30188* (2013.01); *G06T 2207/30192* (2013.01)

(56) References Cited

U.S. PATENT DOCUMENTS

| | | | |
|---|---|---|---|
| 7,680,337 | B2 | 3/2010 | Gruninger et al. |
| 8,094,960 | B2* | 1/2012 | Riley .................. G06K 9/0063 382/191 |
| 9,396,528 | B2* | 7/2016 | Pacifici .................. G06T 5/001 |
| 9,418,411 | B2* | 8/2016 | Patterson .................. G06T 5/50 |
| 2003/0016882 | A1* | 1/2003 | Riley ........................ G01J 3/28 382/275 |
| 2004/0153284 | A1 | 8/2004 | Bernstein |
| 2005/0180651 | A1* | 8/2005 | Bernstein .................. G01J 3/28 382/255 |
| 2008/0084553 | A1 | 4/2008 | Neiss |
| 2010/0008595 | A1* | 1/2010 | Riley .................. G06K 9/0063 382/254 |

OTHER PUBLICATIONS

NPL, Lordache et al., Uncertainty Propagation from Atmospheric Parameters to Sparse Hyperspectral Unmixing, IEEE 2016.*
NPL, Parashar et al., Radar Scatterometer Discrimination of Sea-Ice Types, IEEE Transactions on Geoscience Electronics, vol. GE-15, Np.2, Apr. 1997.*
NPL, Nabata et al., Robust Tracking Control based on Triple Compensation Loop for High Speed Optical Disk, the 11th IEEE International Workshop on Advanced Motion Control Mar. 21-24, 2010, Nagaoka, Japan.*
Cooley, T., Anderson, G.P., Felde, G.W., Hoke, M.L., Ratkowski, A.J., Chetwynd, J.H.,Gardner, J.A., Adler-Golden, S. M., Matthew, M.W., Berk, A., Bernstein, L.S., Acharya, P.K., Miller, D., Lewis, P., "FLAASH, a MODTRAN4-based Atmospheric Correction Algorithm, Its Application and Validation", Geoscience and Remote Sensing Symposium, IGARSS '02. IEEE International , vol. 3, pp. 1414-1418 (2002).
Berk, A., Anderson, G.P., Bernstein, L.S., Acharya, P.K., Dothe, H., Matthew, M.W., Adler-Golden, S.M., Chetwynd Jr, J.H.; Richtsmeier, S.C., Pukall, B., et. al. "MODTRAN 4 Radiative Transfer Modeling for Atmospheric Correction". Proceedings of SPIE—The International Society for Optical Engineering, 3756, pp. 348-353 (1999).
Vermote, E.F., Tanre, D., Deuze, J.L., Herman, M., Morcette, J.-J., "Second Simulation of the Satellite Signal in the Solar Spectrum, 6S: An Overview", Geoscience and Remote Sensing, IEEE Transactions on , vol. 35, No. 3, pp. 675-686, (May 1997).
R. Richter "Atmospheric / Topographic Correction for Airborne Imagery: ATCOR-4 User Guide, Version 5.1". DLR—German Aerospace Center, Remote Sensing Data Center, (Jan. 2010).
Baugh, W.M., Groeneveld, D.P., "Empirical proof of the empirical line", International Journal of Remote Sensing, vol. 29, No. 3-4, pp. 665-672 (2008).
Lach, S.R.; Kerekes, J.P.; , "Atmospheric Compensation using a Geometrically-Compensated Empirical Line Method", Geoscience and Remote Sensing Symposium, 2008. IGARSS 2008. IEEE International , vol. 3, pp. III-664-III-667, (Jul. 2008).
Bernstein, L. S., S. M. Adler-Golden, R. L. Sundberg, and A. Ratkowski. "Improved Reflectance Retrieval from Hyper- and Multispectral Imagery without Prior Scene or Sensor Information", SPIE Proceedings, Remote Sensing of Clouds and the Atmosphere XI. vol. 6362. (2006).
Bernstein, L. S., X. Jin, B. Gregor, S. M. Adler-Golden, "Quick atmospheric correction code: algorithm description and recent upgrades", Optical Engineering, vol. 51, No. 11 (Nov. 2012).
Kurucz, R. L. "The Solar Irradiance by Computation", Proceedings of the 17th Annual Review Conference on Atmospheric Transmission Models, Jun. 7, Air Force Geophys. Lab., Hanscom AFB, MA. (1994).

Klein, A.G., D.K. Hall, and G.A. Riggs, "Improving snow cover mapping in forests through the use of a canopy reflectance model", Hydrological Processes, 12: 1723-1744 (1998).
Poon, S.K.M., and C. Valeo, "Investigation of the MODIS snow mapping algorithm during snowmelt in the northern boreal forest of Canada", Canadian Journal of Remote Sensing, 32: 254-267 (2006).
Winter, ME "N-FINDR: an algorithm for fast autonomous spectral end-member determination in hyperspectral data," Proceedings of SPIE: Imaging Spectrometry, vol. 3753 (1999).
Ifarrguerri, A., Chang, C-I., "Multispectral and hyperspectral image analysis with convex cones", IEEE transactions on Geoscience and Remote Sensing 37, 756-770 (1999).
Berman, Mark, et al. "ICE: A Statistical Approach to Identifying Endmembers in Hyperspectral Images", Geoscience and Remote Sensing, IEEE Transactions on 4210 (2004): 2085-2095.
Nascimento, José MP, and JM Bioucas Dias. "Vertex Component Analysis: A Fast Algorithm to Unmix Hyperspectral Data", Geoscience and Remote Sensing, IEEE Transactions on 43.4 898-910 (2005).
Gruninger, John H., Anthony J. Ratkowski, and Michael L. Hoke. "The sequential maximum angle convex cone (SMACC) endmember model", Proceedings of SPIE. vol. 5425. (2004).
Brown, Matthew S., et al. "Development of an efficient automated hyperspectral processing system using embedded computing", SPIE Defense, Security, and Sensing. International Society for Optics and Photonics, (2012).
Bernstein, L.S., Adler-Golden, S.M., Sundberg, R.L., Levine, R.Y., Perkins, T.C., Berk, A., Ratkowski, A.J., Felde, G., Hoke, M.L., , "A New Method for Atmospheric Correction and Aerosol Optical Property Retrieval for VIS-SWIR Multi- and Hyperspectral Imaging Sensors: QUAC (QUick Atmospheric Correction)", Geoscience and Remote Sensing Symposium, IGARSS '05. Proceedings. 2005 IEEE International , vol. 5, pp. 3549-3552, (Jul. 2005).
Hansen, J. E., and L. D. Travis, "Light Scattering in Planetary Atmospheres". Space Sci. Rev., 16, 527-610 (1974).
A. Berk, G. P. Anderson, P. K. Acharya, L. S. Bernstein, L. Muratov, J. Lee, M. Fox, S. M. Adler-Golden, J. H. Chetwynd, M. L. Hoke, R. B. Lockwood, J. A. Gardner, T. W. Cooley, C. C. Borel, and P. E. Lewis, "MODTRANtm5: A Reformulated Atmospheric Band Model with Auxiliary Species and Practical Multiple Scattering Options: Update", Proc. SPIE 5806, 662-667 (2005).
Joseph, J. H., W. J. Wiscombe, and J. A. Weinman. "The Delta-Eddington Approximation for Radiative Flux Transfer", Journal of the Atmospheric Sciences vol. 33, 12, 2452-2459 (1976).
Meador, W. E., and W. R. Weaver. "Two-Stream Approximations to Radiative Transfer in Planetary Atmospheres: A Unified Description of Existing Methods and a New Improvement", Journal of the atmospheric sciences vol. 37, 3, pp. 630-643 (1980).
Jiménez Aquino, J. I., and J. R. Varela. "Two stream approximation to radiative transfer equation: An alternative method of solution", Revista mexicana de fisica 51.001 (2005).
Isaacs, R. G., et al. "Multiple scattering LOWTRAN and FASCODE models", Applied optics 26.7 (1987): 1272-1281.
Henyey, Louis G., and Jesse L. Greenstein. "Difuse Radiation in the Galaxy", The Astrophysical Journal vol. 93, pp. 70-83 (1941).
Elvidge C., D., "Visible and near infrared reflectance characteristics of dry plant materials", Remote Sensing vol. 11, 10, pp. 1775-1795 (1990).
Lindberg, J. D, Smith, M. S., "Reflectance Spectra of Gypsum Sand from the White Sands National Monument and Basalt from a Nearby Lava Flow", American Mineralogist, vol. 58, 1062-1064, (1973).
Kaufman, Y. J., et al. "Operational remote sensing of tropospheric aerosol over land from EOS moderate resolution imaging spectroradiometer", J. Geophys. Res vol. 102, 17 051-17, (1997).
Kaufman, Yoram J., and Didier Tanré. "Algorithm for Remote Sensing of Tropospheric Aerosol From MODIS", NASA MODIS Algorithm Theoretical Basis Document, Goddard Space Flight Center 85 (1998).
Remer, Lorraine A., et al. "The MODIS Aerosol Algorithm, Products, and Validation", Journal of the Atmospheric Sciences vol. 62, 4, pp. 947-973 (2005).

(56) References Cited

OTHER PUBLICATIONS

Chein-I Chang, "Spectral Information Divergence for Hyperspectral Image Analysis", Geoscience and Remote Sensing Symposium, 1999. IGARSS '99 Proceedings. IEEE 1999 International , vol. 1, pp. 509-511 (1999).
Bartlett B, Schott J.R. "Atmospheric compensation in the presence of clouds: an adaptive empirical line method (AELM) approach.", J. Appl. Remote Sens. vol. 3, 033507 (Feb. 2009).
Gruninger, John, et al. "Use of the Vis-SWIR to aid atomospheric correction of multispectral and hyperspectral thermal infrared (TIR) imagery: The TIR model", SPIE Proceeding, Imaging Spectroscopy VIII, vol. 4816-11, Jul. 2002.
Bernstein, L.S., et al. "In-scene-based atmospheric correction of uncalibrated VISible-SWIR (VIS-SWIR) hyper- and multispectral imagery", SPIE Proceeding, Europe Security and Defense, Remote Sensing, vol. 7107, 2008.
Lau, Ian C, "Application of Atmospheric Correction to Hyperspectral Data: Comparisons of Different Techniques on Hymap Data", Australasian Remote Sensing and Photogrammetry Conference (12th: 2004: Fremantle, Western Australia).
Mahiny, Abdolrassoul S. and Turner, Brian J. "A Comparison of Four Common Atmospheric Correction Methods", Photogrammetric Engineering & Remote Sensing, vol. 73, No. 4, pp. 361-368, Apr. 2007.
Choi, Kyu-Young and Milton, Edward J. "A model-based approach to correcting spectral irradiance data using an upward-looking airborne sensor (CASI ILS)", Geomatics, Earth Observation and the Information Society 1st Annual Meeting of the REmote Sensing and Photogrammetry Society; Nottingham, UK, Remote Sensing and Photogrammetry Society, pp. 64-75, 2001.
Resmini, Ronald, "Simultaneous Spectral/Spatial Detection of Edges for Hyperspectral Imagery: The HySPADE Algorithm Revisited", The MITRE Corporation, 2012, accessed at: http://www.mitre.org/work/tech_papers/2012/12_1122/.
Kaufman, Y. J. and Gao, B-C. "Remote Sensing of Water Vapor in the Near IR from EOS/MODIS", Geoscience and Remote Sensing, IEEE Transactions on 30.5 (1992): 871-884.
Felde, G.W., et al. "Water Vapor Retrieval Using the FLAASH Atmospheric Correction Algorithm", Defense and Security, International Society for Optics and Photonics, pp. 357-367, 2004.
Homolova, L. et al. "Sensitivity of the Ground-Based Downwelling Irradiance Recorded by the Fodis Sensor in Respect of Different Angular Positions", Hyperpsectral Image and Signal Processing: Evolution in Remote Sensing, 2009, WHISPERS '09, First Workshop on pp. 1-4, IEEE.
Rice, J.R., "Experiments on Gram-Schmidt Orthogonalization," Math. Comp. 20 (1966), pp. 325-328.
ASTER spectral library documentation, http://speclib.jpl.nasa.gov/, as captured by the Wayback Machine, Sep. 28, 2013.
USGS Digital Spectral Library, http://speclab.cr.usgs.gov/spectral-lib.html, as captured by the Wayback Machine, Nov. 11, 2013.
Johns Hopkins University Spectral Library, http://speclib.jpl.nasa.gov/documents/jhu_desc, as captured by the Wayback Machine, Jun. 23, 2013.
U.S. Appl. No. 14/103,235, Non-Final Office Action dated Dec. 18, 2015.

* cited by examiner

METHOD FOR IN-SCENE COMPENSATION USING WATER VAPOR CONTENT

FIELD OF THE DISCLOSURE

The present disclosure relates generally to spectral imagery, and more particularly to atmospheric compensation of multispectral and/or hyperspectral imagery.

BACKGROUND

Spectral imaging relates to the acquisition of information about an object, area, or phenomenon by analyzing data acquired by a sensing device not in contact with the object, area, or phenomenon. From this point forward, the term hyperspectral will be used generally to refer to either or both of hyperspectral and multispectral.

Spectral imaging and analysis is used in a wide range of applications. These applications include but are not limited to surveillance, airborne observation of the health and growth of agricultural crops, environmental emissions monitoring, identifying minerals of interest in geological samples, and monitoring and sorting of food products.

Hyperspectral imaging involves acquiring and analyzing information from among several different spectral bands across the electromagnetic spectrum. A hyperspectral image typically consists of a set of images, each image taken in a specific band of the spectrum. FIG. 1 is a representative drawing of an airborne spectral sensor 102 mounted on an aircraft 104 that takes a plurality of images 120, 122, 124, 126, 128 of a single scene, each image being taken in a different spectral band. The set of images taken across different bands together forms a hyperspectral image 110, sometimes called a hyperspectral cube.

In some applications, a hyperspectral image is generated by an airborne sensor. For example, a sensor may be mounted to a satellite or an aircraft, and may take images of the surface of the earth or of the sky. In other applications, a sensor may be positioned in other ways or locations, for example on a tripod directed at a scene on the ground.

One of the major problems in the field of solar reflective (i.e. Visible/Near Infrared/Short Wave Infrared bands or VIS/NIR/SWIR) remote hyperspectral imaging is the influence of the environment, and to some degree of the instrument, on the measurements. Through different physical processes, the environment can modify the apparent spectral signatures of the surfaces being imaged and make them more difficult to identify or in a more general sense to exploit. A role of hyperspectral imagery compensation, also known as correction, is to remove one or more of these effects. The images may then be converted so that the spectra have reflectance units. Reflectance may be a more useful quantity than radiance since it is intrinsic to the observed material and has no dependence on the environment. Reflectance may then be used for target identification or surface characterization.

There are generally two different classes of algorithms that attempt to transform radiance or raw images into reflectance. One class consists of first principles methods that rely on physical knowledge of how the environment interacts with the surfaces to produce radiance. These are sometimes referred to as model based methods or radiative transfer methods. The other class consists of empirical methods, which are sometimes referred to as in-scene methods. Both classes of algorithms have benefits and drawbacks.

First principles methods typically use accurate models of radiative transfer in the atmosphere in order to calculate the environmental effect on the target signature and to remove it. These are fundamental methods that are based on the physical modeling of the environment and its radiative interaction with the measured surfaces. Once this interaction is well understood and can be numerically quantified, it can be removed mathematically from the measured signal to reveal the intrinsic surface characteristics, usually the surface reflectance.

Examples of first principle techniques are Fast Line-of-sight Atmospheric Analysis of Hypercubes (FLAASH™) and Atmospheric and Topographic Correction (ATCOR™-4). Further examples of first principle techniques include Atmospheric CORrection Now (ACORN) and Atmosphere REMoval (ATREM).

First principles methods have a number of advantages, which may include but are not limited to one or more of the following. It may be possible to attain very high precision levels of accuracy in cases where the optical properties of the sensor and environment are known, since the modeling of the phenomenology is well understood and modeled. In addition, the underlying physical understanding of the phenomena that modify the measured signal can lead to the deduction of certain parameters required for the modeling, such as the quantity of water vapor in the air column or the aerosol load. Furthermore, since the correction can be applied on a pixel-by-pixel basis, other local effects can sometimes also be removed. Also, the properties of the surfaces themselves, such as the directionality of their reflectance (e.g. bidirectional reflectance distribution function—BRDF), may also be modeled accurately and contribute to the accuracy or interpretation of the correction. Moreover, prior knowledge of scene elements may not be strictly necessary since atmospheric modeling does not depend on them in a first approximation level, for example if the effect of neighboring surfaces (adjacency) is neglected.

Although first principles modeling may be a very powerful tool for hyperspectral image compensation, there are one or more drawbacks to using them in some circumstances. These disadvantages may include but are not limited to one or more of the following. Accurate radiative transfer calculations can require one or both of a large amount of computer processing power and processing time. In addition, the accuracy of modeling results is sensitive to the characterization of atmospheric parameters such as pressure, temperature and water vapor profiles. In addition, radiative transfer atmospheric compensation techniques generally do not perform well in less than ideal environmental conditions, for example partly to fully overcast conditions and dusty conditions. Furthermore, first principles methods concentrate on the modeling of the atmosphere. Sensor characteristics are usually required to be well known and accounted for before the correction can be applied. If this is not the case large errors are likely to occur.

Again, these are only some possible advantages and disadvantages of first principle (i.e. radiative transfer) methods.

The other class of atmospheric compensation algorithms is based on empirical methods. These algorithms are typically purely empirical in that they require no prior knowledge of the atmosphere or environment, and no physical modeling of radiation transport processes is needed. Instead, they rely on the presence of surfaces of known reflectance within the scene to calibrate the sensor-atmosphere system. This usually implies finding a linear relationship that transforms the measured arbitrarily-calibrated measurement of these known targets into their known reflectance. It is then assumed that this linear relationship holds for all other pixels in the scene, giving rise to a reflectance image. Since there are two unknowns to be found—the gain and the offset—at least two known targets that are sufficiently different in all spectral bands must be present in the scene.

This type of approach is known as an Empirical Line Method (ELM). ELM is independent of any knowledge or pre-calibration of the sensor, since the effect of the sensor is implicitly included in the calibration target measured signatures. In addition, the ELM algorithm is relatively compact and simple and does not depend on external models. This translates to much faster calculations that are easily implemented into parallel (multi-processor) or super-parallel (GPU) architectures. Furthermore, in ELM the knowledge of atmospheric properties or aerosol load is not necessary since their effect is automatically considered in the calculation of the gain and offset parameters.

However, empirical methods have some drawbacks. These drawbacks may include but are not limited to the following. One drawback is that the assumption is made that the scene properties are uniform: the calibration in gain and offset is applied identically throughout the entire image. This excludes directly taking into account broken clouds, adjacency effects or spatial variability in aerosol load or water vapor content.

Another disadvantage may be that surfaces of known reflectances that are sufficiently different throughout their spectral signature must be present within the image in order to find the required gains and offsets at each spectral band. In other words, knowledge of image elements in the scene must be known a priori. Therefore empirical methods are often not well suited to applications where there is little or no prior information about a potential scene. This condition is rarely fulfilled in operational contexts, which may include certain surveillance and military operations.

In addition to the above mentioned class of atmospheric compensation methods that are based on empirical methods, a more recent family of algorithms has been introduced in an attempt to alleviate some of the drawbacks of purely empirical methods. This family of algorithms may be referred to as empirical-statistical algorithms. For example, the Quick Atmospheric Correction (QUAC™) attempts to eliminate the principal inconvenience of the traditional ELM algorithm in operational contexts, that is, to eliminate the need for a priori knowledge of scene element reflectances.

The QUAC family of methods is based on a number of statistical observations that seem to hold on a number of hyperspectral and multispectral images: notably, that the mean reflectance of many scene endmembers (at least 10) is constant (within a multiplicative constant) from scene to scene, as long as the scene is diversified enough. The QUAC method also relies on the presence of a dark (very low reflectance) pixel somewhere in the scene. These two hypotheses are then used to calculate the gain and offset parameters similarly to the ELM method. Vegetation pixels can be used to calculate the multiplicative factor that transforms reflectance from relative to absolute, since vegetation reflectance amplitude above the red edge is relatively predictable.

In a 2012 paper describing some revision to the QUAC algorithms, it is explained that although the above described observation on which QUAC is based holds for a wide variety of scenes, there are exceptions in which the observation does not hold. The identified exceptions include when there is vegetation, mud, or very shallow water in the spectral image. In this revision, the proposed solution is to detect the situations in which the performance of QUAC would degrade significantly (e.g. presence of mud, shallow water, etc.) and adjust the universal reflectance spectrum code accordingly.

Although the more recent revision of QUAC attempts to identify and account for the known situations in which QUAC would otherwise fail or suffer degraded performance, the reality is that there will likely always be cases where QUAC will fail since it is difficult if not impossible to predict all of these situations in advance. For example, it has been observed by the present inventors that the version of QUAC that is commercially available in ENVI™ 5.0 (a product or Exelis™) performs poorly or fails for some winter scenes. This is only one example of a type of scene for which a recent version of QUAC has poor performance. It is very likely that QUAC will have difficulties with other types of scenes as well. Therefore there is a need for a robust atmospheric compensation technique that does not rely as much on the identification and adjustment for problematic scenes or materials.

Therefore existing atmospheric compensation methods include first principles methods, purely empirical methods, and QUAC.

In addition, some atmospheric correction techniques use additional instrumentation to measure and collect information that can be used to compensate for atmospheric effects. For example, some hyperspectral sensors are used in conjunction with a fiber optic downwelling irradiance sensor (FODIS). The FODIS collects additional information that is used in the atmospheric compensation process.

Where the use or definition of a term or expression in a reference that is incorporated herein by reference is different or inconsistent with the use or definition of the term or expression as used herein, the use or definition of the term or expression provided herein applies.

SUMMARY

The present disclosure is directed to a method for automatically performing atmospheric compensation of a multi or hyper spectral image, the method comprising transforming, at least two endmembers extracted from the image into at-ground reflectance, finding a matching component in a spectral library for each of the at least two extracted endmembers, each extracted endmember and matching component together forming a matched extracted endmember and spectral library component pair, calculating a gain value and an offset value using the at least two matched extracted endmember and spectral library component pairs, and compensating at least part of the image using the calculated gain and offset values.

The present disclosure is also directed to a method for automatically performing atmospheric compensation of a multi or hyper spectral image, the method comprising transforming, at least one endmember extracted from the image into at-ground reflectance, finding a matching component in a spectral library for each of the at least one endmember extracted from the image, each extracted endmember and matching component together forming a matched extracted endmember and spectral library component pair, calculating an offset value using a black level obtained from the image or from a radiative transfer model, calculating a gain value using the at least one matched extracted endmember and spectral library component pair and the black level, and compensating at least part of the image using the calculated gain and offset values.

The present disclosure is also directed to a method for use in atmospheric compensation of a multi or hyper spectral image, the method comprising designating pixels of the image into one of at least a lower water content group and a higher water content group based on a retrieved water vapor value of each pixel, calculating an average water vapor content value for each of the lower and higher water content groups of pixels, calculating a gain value and an offset value for each of the lower and higher water content groups, associating each of the average water vapor content values with the respective gain and offset values of each of the lower and higher water content groups, calculating gain and offset values for individual pixels of the image by interpolating or extrapolating based on the two average water vapor content values using the water vapor value of each pixel, and compensating at least part of the image using the calculated gain and offset values of the individual pixels.

The present disclosure is also directed to a method for use in shadow compensation of a multi or hyper spectral image, the method comprising (a) identifying a brightest pixel in the image in term of its norm and assuming the pixel is fully lit by both the sun and the sky, (b) determining a direct flux (sun) and a diffuse flux (sky) of the pixel, (c) determining a sunlit only surface signature and a skylit only surface signature of the pixel using the direct and diffuse fluxes, (d) determining an abundance of each of the sunlit surface and skylit surface signatures in pixels of the image, and removing the sunlit surface and skylit surface signatures from pixels of the image, (e) repeating (a) through (d) a predetermined number of times or until the norm of the pixel last identified in (a) is below a predetermined threshold value, where the pixel identified in (a) in the next iteration is the next brightest pixel in the image after the previous iteration sunlit and skylit only surface signatures have been removed, and (f) compensating at least some pixels of the image, where a given pixel is compensated using the direct and diffuse fluxes of the given pixel as well as a sun illumination factor and a sky illumination factor of the given pixel, the sun illumination factor being the sum of the abundances of the sunlit surface signatures and the sky illumination factor being a sum of the abundances of the skylit surface signatures of all pixels selected in the iterative process for the given pixel.

The present disclosure is also directed to a non-transitory computer-readable storage medium comprising instructions for execution on one or more electronic devices, the instructions for a method for automatically performing atmospheric compensation of a multi or hyper spectral image, the method comprising transforming, at least two endmembers extracted from the image into at-ground reflectance, finding a matching component in a spectral library for each of the at least two extracted endmembers, each extracted endmember and matching component together forming a matched extracted endmember and spectral library component pair, calculating a gain value and an offset value using the at least two matched extracted endmember and spectral library component pairs, and compensating at least part of the image using the calculated gain and offset values.

The present disclosure is also directed to a non-transitory computer-readable storage medium comprising instructions for execution on one or more electronic devices, the instructions for a method for automatically performing atmospheric compensation of a multi or hyper spectral image, the method comprising transforming, at least one endmember extracted from the image into at-ground reflectance, finding a matching component in a spectral library for each of the at least one endmember extracted from the image, each extracted endmember and matching component together forming a matched extracted endmember and spectral library component pair, calculating an offset value using a black level obtained from the image or from a radiative transfer model, calculating a gain value using the at least one matched extracted endmember and spectral library component pair and the black level, and compensating at least part of the image using the calculated gain and offset values.

The present disclosure is also directed to a non-transitory computer-readable storage medium comprising instructions for execution on one or more electronic devices, the instructions for a method for performing atmospheric compensation of a multi or hyper spectral image, the method comprising designating pixels of the image into one of at least a lower water content group and a higher water content group based on a retrieved water vapor value of each pixel, calculating an average water vapor content value for each of the lower and higher water content groups of pixels, calculating a gain value and an offset value for each of the lower and higher water content groups, associating each of the average water vapor content values with the respective gain and offset values of each of the lower and higher water content groups, calculating gain and offset values for individual pixels of the image by interpolating or extrapolating based on the two average water vapor content values using the water vapor value of each pixel, and compensating at least part of the image using the calculated gain and offset values of the individual pixels.

The present disclosure is also directed to a non-transitory computer-readable storage medium comprising instructions for execution on one or more electronic devices, the instructions for a method for performing shadow compensation of a multi or hyper spectral image, the method comprising (a) identifying a brightest pixel in the image in term of its norm and assuming the pixel is fully lit by both the sun and the sky, (b) determining a direct flux (sun) and a diffuse flux (sky) of the pixel, (c) determining a sunlit only surface signature and a skylit only surface signature of the pixel using the direct and diffuse fluxes, (d) determining an abundance of each of the sunlit surface and skylit surface signatures in pixels of the image, and removing the sunlit surface and skylit surface signatures from pixels of the image, (e) repeating (a) through (d) a predetermined number of times or until the norm of the pixel last identified in (a) is below a predetermined threshold value, where the pixel identified in (a) in the next iteration is the next brightest pixel in the image after the previous iteration sunlit and skylit only surface signatures have been removed, and (f) compensating at least some pixels of the image, where a given pixel is compensated using the direct and diffuse fluxes of the given pixel as well as a sun illumination factor and a sky illumination factor of the given pixel, the sun illumination factor being the sum of the abundances of the sunlit surface signatures and the sky illumination factor being a sum of the abundances of the skylit surface signatures of all pixels selected in the iterative process for the given pixel.

BRIEF DESCRIPTION OF THE DRAWINGS

The present disclosure will be better understood having regard to the drawings in which.

DETAILED DESCRIPTION OF THE DRAWINGS

Figure 1:
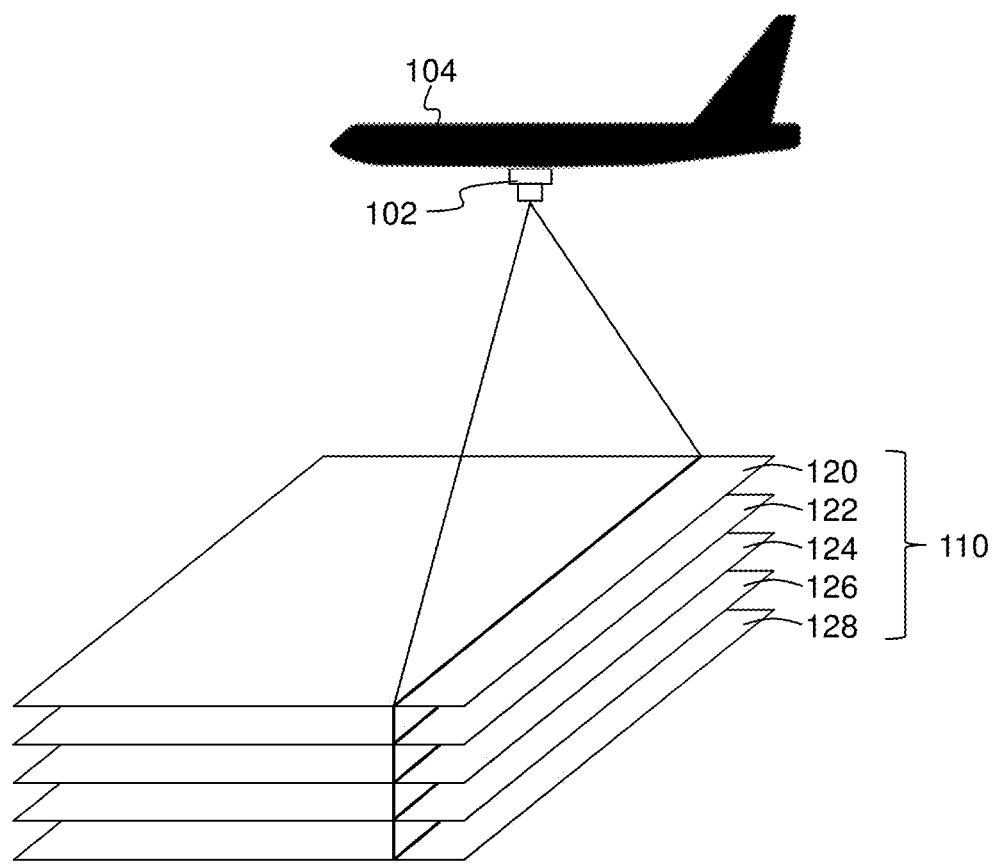
FIG. 1 is a drawing representing an airborne spectral sensor collecting a plurality of images each at a different spectral band.

The present disclosure is directed to methods and techniques for use in atmospheric compensation of images in the solar reflective wavelength range (e.g. <3000 nm).

In one aspect, the present disclosure is directed to atmospheric compensation algorithms for use with hyperspectral and multispectral images. At least one algorithm is a two-pass hybrid approach that applies a first correction that transforms image endmembers (usually in at-sensor radiance units) into approximate reflectance. The resulting reflectance endmembers may then be matched to elements in a spectra library, and a correction may then be established in a manner similar to empirical line methods. For example, pixels of the input image may be corrected using calculated gain and offset values to transform the pixels from radiance into at-ground reflectance. The algorithm may achieve results with similar accuracy as first principles methods with a speed comparable to empirical methods. The new algorithm may therefore be useful in operational contexts for near real time detection and classification purposes.

In another aspect, the present disclosure is directed to atmospheric compensation comprising one or more of the following: transforming radiance calibrated measurements into approximate reflectance using top-of-atmosphere solar irradiance; masking anomalous pixels that may corrupt or otherwise negatively affect the correction; extracting endmembers from the transformed scene; correcting the endmembers, sometimes approximately, to at-ground reflectance; matching resulting reflectance endmembers to known reflectances contained in a reflectance library; using the matched library spectra along with the corresponding measured spectra to compute the gain and offset parameters; and transforming the original radiance image into a reflectance image using the calculated spectral gain and offset.

In another aspect, the present disclosure relates to atmospheric compensation in which the effects of water absorption are reduced or removed from a multi or hyper spectral image. Pixels of an input image may be divided into at least two groups, a lower water content group and a higher water content group. Gain and offset values are determined for each of the groups. An average water vapor content value is also calculated for each of the groups. Gain and offset values may then be determined for individual pixels of the input image by interpolating or extrapolating based on the two average water vapor content values using the water vapor value of an individual pixel.

In another aspect, the present disclosure relates to methods for performing shadow compensation on hyper and/or multi spectral images.

Figure 2:
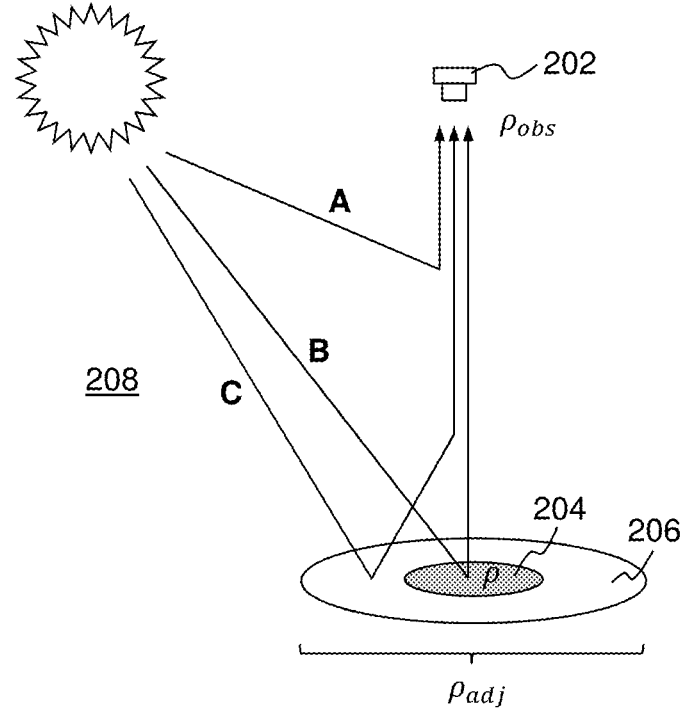
FIG. 2 is a drawing representing various light paths from the atmosphere (e.g. the sun) to a spectral sensor.

In a multispectral or hyperspectral image, the radiance at the sensor for each pixel and wavelength may be represented by the following equation:

$$R(\lambda) = S_n(\lambda)\left[A(\lambda) + \frac{B(\lambda)}{1-\rho_{adj}(\lambda)S_{alb}(\lambda)}\rho(\lambda) + \frac{C(\lambda)}{1-\rho_{adj}(\lambda)S_{alb}(\lambda)}\rho_{adj}(\lambda)\right] \quad (1)$$

Where $S_n$ is the solar flux normal to the surface above the atmosphere, $\rho$ is the actual surface reflectance, $\rho_{adj}$ is the average reflectance of the surfaces adjacent to the measured surface and $S_{alb}$ is the atmosphere spherical albedo—the capacity of the atmosphere to reflect upwelling radiation from the ground back towards the ground. The A, B and C coefficients represent the scattering and extinction effects along different paths in the atmosphere as represented by FIG. 2; A represents the radiance contribution of the sun directly scattered by the atmosphere while never encountering the surface, B is the transmittance along the sun to surface to sensor path and C is the light that was reflected off other adjacent surfaces before being scattered by the atmosphere between the sensor and the measured surface (giving rise to the adjacency effect).

The observed reflectance at the sensor is obtained by dividing the at-sensor radiance by the incident solar flux:

$$\rho_{obs}(\lambda) = \frac{R(\lambda)}{S_n(\lambda)} \quad (2)$$

And the surface reflectance can be isolated to yield:

$$\rho(\lambda) = \frac{1-\rho_{adj}(\lambda)S_{alb}(\lambda)}{B(\lambda)}\left[\rho_{obs}(\lambda) - A(\lambda) - \frac{C(\lambda)}{1-\rho_{adj}(\lambda)S_{alb}(\lambda)}\rho_{adj}(\lambda)\right] \quad (3)$$

FIG. 2 is a diagram showing various paths of light coming from the atmosphere or space and ending up at an airborne sensor 202. The $\rho$ is the ground reflectance of object or target 204, $\rho_{adj}$ is the average reflectance in the area adjacent to the target, and $\rho_{obs}$ is the reflectance observed by sensor 202. As shown in FIG. 2, light may be reflected by target 204, other objects or surfaces 206, such as the ground, or by the atmosphere 208 (e.g. after atmospheric or solar light has been scattered). The A, B and C coefficients in equation (3) and shown in FIG. 2 represent the scattering and extinction effects along different paths in the atmosphere.

In reality, the adjacent reflectances $\rho_{adj}$ in the denominator of the B and C terms are not exactly the same as those in the numerator of the C term because they do not stem from the same scattering geometry, but they can usually be approximated as being equal. Furthermore, equation (3) can be re-written in a simple linear correction form with a gain $\alpha$ and offset $\beta$ $$\rho(\lambda) = a(\lambda)\rho_{obs}(\lambda) + \beta(\lambda) \quad (4)$$

where $$a(\lambda) = \frac{1 - \rho_{adj}(\lambda)S_{alb}(\lambda)}{B(\lambda)} \quad (4)$$

and $$B(\lambda) = A(\lambda)\left[\frac{1 - \rho_{adj}(\lambda)S_{alb}(\lambda)}{B(\lambda)}\right] - \frac{C(\lambda)}{B(\lambda)}\rho_{adj}(\lambda). \quad (5)$$

Or $$B(\lambda) = A(\lambda)\alpha(\lambda) - \frac{C(\lambda)}{B(\lambda)}\rho_{adj}(\lambda) \quad (7)$$

All relevant quantities, the A, B and C coefficients, $S_{alb}$ and the kernel required to obtain the average ground reflectance $\rho_{adj}$ are usually calculated from existing radiative transfer models such as MODTRAN™ or 6S. Also note that the gain and offset terms can be dependent on the pixel location Aspects of the present disclosure are now described in more detail.

Figure 3:
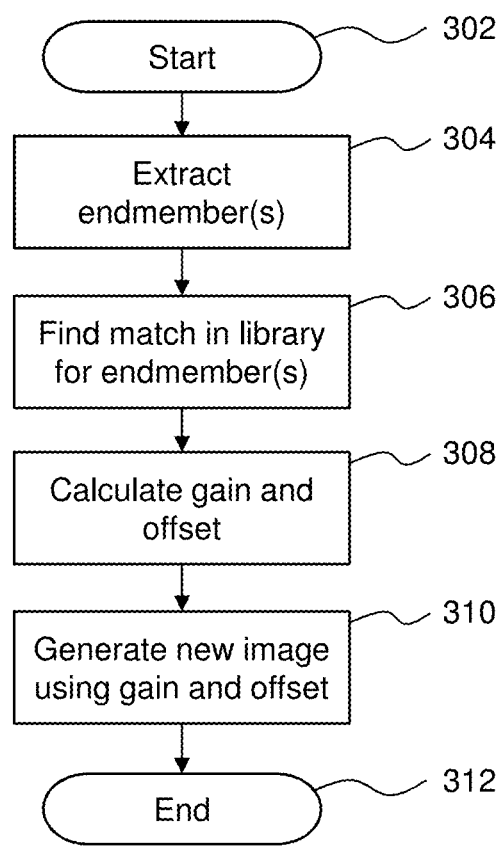
FIG. 3 is a flow diagram of a process for atmospheric compensation according to the present disclosure.

FIG. 3 shows a process for atmospheric compensation according to one aspect of the present disclosure.

The process starts at block 302 and proceeds to block 304, where at least two endmembers are extracted from an image, in some embodiments an input image. The extracted endmembers are generally in the form of extracted pixel endmembers, although this is not necessarily a requirement in all embodiments. The process then proceeds to block 306 where the at least two extracted endmembers are compared to a spectral library. A match is selected for each of the at least two extracted endmembers. The process then proceeds to block 308 where gain and offset values are calculated using the matched extracted endmember and library component pairs. The process then proceeds to block 310 where a new or compensated image is generated by applying the calculated gain and offset values to the input image. The process then proceeds to block 312 and ends.

The process shown in FIG. 3 uses two or more extracted endmembers to calculate gain and offset values. However, it may also be possible to calculate gain and offset values using one (at least one) extracted endmember and a black level. The gain value may be determined using a matched extracted endmember and spectral library component pair, and a black level obtained from the image or from a radiative transfer model. The offset may be determined using the black level. In at least some embodiments, the order of calculating gain and offset values is not necessarily crucial; the gain may be calculated before the offset or the offset may be calculated before the gain. In other embodiments, more than one extracted endmember may be used to calculate a gain value.

Accordingly, since there are two unknowns, gain and offset, these values may be calculated using at least two extracted endmember and spectral library component pairs. These at least two pairs provide at least two equations, which may be solved for the two unknowns. In other embodiments, gain and offset values may be determined using at least one extracted endmember and spectral library component pair and a black level. The at least one extracted endmember and spectral library component pair and the black level may be used to determine the gain. The offset is determined based on the black level.

Figure 4:
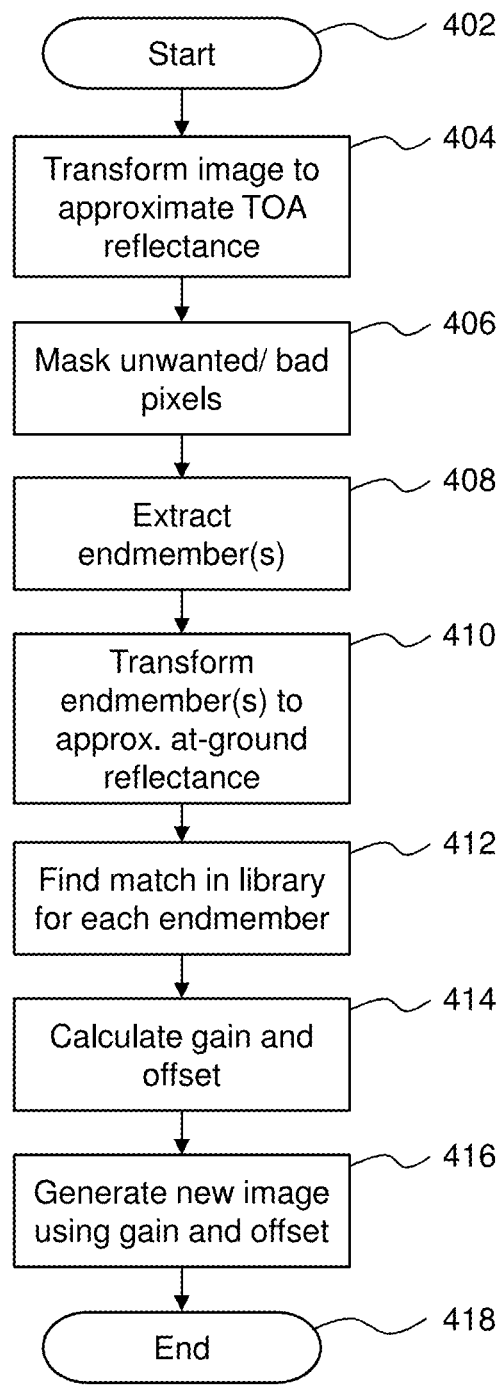
FIG. 4 is a flow diagram of a process for atmospheric compensation according to the present disclosure.

According to another aspect of the present disclosure, a method for atmospheric compensation is provided. For descriptive purposes, the method or algorithm may be divided into four main steps: transforming an input image into a top of atmosphere (TOA) reflectance image; extracting one or more endmembers from the TOA reflectance image; transforming (or "correcting") the endmembers to at-ground (e.g. intrinsic) but approximate reflectances and matching the spectra of these endmembers to spectra in a library; and computing gain and offset values using the resulting matched endmembers and library spectra, and applying these to one or more corresponding bands of the input image to derive a compensated (or "corrected") reflectance image. FIG. 4 shows a process for use in atmospheric compensation according to this aspect of the present disclosure.

Although a specific number and order of steps (blocks) are shown in FIG. 4, this is not meant to be limiting. Other embodiments may have fewer or more steps, and the steps may be performed in a different order as far as is possible.

The process shown in FIG. 4 starts at block 402 and proceeds to block 404, where an input image or a portion thereof may be transformed into top of atmosphere (TOA) reflectance. In some embodiments, the input spectral image may be calibrated in radiometric units, such as for example at-sensor radiance. In other embodiments, the input spectral image may be uncalibrated. Whether or not the input image is calibrated may depend on the one or more techniques or algorithms used in one or more following steps in the process.

Endmember extraction algorithms are more effective when image spectra from pixel to pixel are as different as possible. Therefore in at least some embodiments, it is beneficial to remove common spectral elements such as the solar spectrum. This may be achieved by normalizing the input image, or a part thereof, by the extra-atmospheric solar irradiance. In addition, the image may be normalized by the extra-atmospheric solar irradiance that is resampled to the sensor resolution and that may be normalized (or modeled or adjusted) according to the sun-earth distance.

The input image may be normalized using any suitable method or technique. For example, the image or a sub-portion thereof maybe normalized using the methods described in Kurucz, R. L., The Solar Interior and Atmospheric (A. N. Cox, W. C. Livingston, and M. Matthews, Eds.), University of Arizona Press, Tucson, pp. 1-663 (1992), or Kurucz, R. L. "The solar irradiance by computation", Proceedings of the 17th Annual Review Conference on Atmospheric Transmission Models, 7 June, Air Force Geophys. Lab., Hanscom AFB, Mass. (1994), the contents of which are incorporated herein by reference.

In at least one embodiment, only a portion of the image is transformed to top-of-atmosphere reflectance. The portion of the image that is transformed may correspond to a limited number of spectral bands of the image that is needed to find the required endmembers. Transforming only a limited number of bands in the image may be advantageous. For example, most endmember extraction algorithms require only as many bands as the desired number of endmembers, or even fewer bands, in order to function correctly. Thus transforming only a limited number of bands may have a partial or even significant speed advantage over transforming all bands. In contrast, transforming additional bands in excess of the number of bands needed may unnecessarily take up more time and use processing resources.

In at least one embodiment, one or more bands that are transformed may correspond to one or more window regions of the atmosphere. A window region of the atmosphere is a band where there is little molecular absorption of light by molecules in the atmosphere. In this sense, the atmosphere is more or less transparent in a window region. By using and transforming bands that correspond to window regions, an endmember extraction algorithm may be made more effective since some common features amongst image pixels, such as absorption features, are not present or are relatively low in the window regions. Furthermore, as mentioned above, transforming only a limited number of bands may be advantageous in terms of one or both of processing time and use of processing resources compared to transforming more or all bands.

In at least one embodiment, the algorithm attempts to find bands close to one or more of 0.47, 0.55, 0.66, 0.86, 1.027, 1.246, 1.38, 1.612 and 2.15 μm in the input image to be transformed to TOA reflectance. Most of these bands correspond to window regions of the atmosphere (except for the 1.38 band, which corresponds to a water absorption band used for cirrus cloud detection) and are well suited for endmember extraction. This is merely an example. One or more bands at different wavelengths may be transformed.

In at least one embodiment, the transformation may additionally use downwelling flux measurements in order to obtain more accuracy. These measurements may be obtained from a downwelling irradiance sensor. The use of downwelling flux measurements may be desirable in less than ideal environmental conditions, for example where there are clouds (broken or unbroken cloud cover) located above a target and the spectral sensor. If the downwelling flux measurements contain the same sensor effects as the data and is in the same units (as is often the case when using an at-sensor FODIS), the approximate reflectance may be obtained with:

$$\rho = \frac{M}{I_{meas}} \quad (8)$$

where M is the measurement and $I_{meas}$ is the measured downwelling flux including the sensor effects and with the same units as M. Using at sensor downwelling irradiance or even better, irradiance collected at ground level close to the image location, has the benefit of removing at least part of the transmission effects. In addition, since it is a measurement, it reflects the actual state of the atmosphere. As a result, difficult and even cloudy (broken or not) conditions may be transformed with more accuracy.

Data from a downwelling irradiance sensor may also be used in clear sky conditions. In addition, a downwelling irradiance sensor may be used when the input spectral image is arbitrarily calibrated so long as the downwelling irradiance sensor provides data with the same arbitrary calibration as the input spectral image.

The process then proceeds from block 404 to block 406 where one or more pixels, such as bad, anomalous or unwanted pixels, may be masked or removed. Masking may involve simply ignoring one or more pixels. Certain kinds of pixels may negatively affect the correction and therefore it may be desirable to remove them. Since the correction coefficients (e.g. α and β in equations (5) and (6) above) may be obtained from the relation between image (endmember) pixel spectra and library spectra, bad or unwanted pixels that may negatively affect the correction may be removed. Unwanted pixels may include one or more of bad pixels, corrupted pixels, pixels that may have been added to the edge of the image by procedures such as orthorectification, sharp glints, hot objects and clouds. Some of these unwanted pixels may not have a corresponding component (or "entry") in a spectral library and may therefore skew the overall result of the atmospheric compensation. In addition, vegetation pixels may also negatively affect the overall results as they may have a sharp reflectance characteristic (e.g. a red edge). In at least one embodiment, pixels containing vegetation or other materials having a sharp reflectance characteristic may be masked or otherwise ignored.

Pixel masking may be less important in embodiments that use a weighted algorithm (e.g. least squares, etc.) for calculating gain and/or offset values since pixels having either no match or a poor match in the spectral library will be assigned a lower weight and thus will have a diminished impact on the overall accuracy and performance of the compensation algorithm.

The process proceeds from block 406 to block 408 where one or more endmembers are extracted from the transformed image data. An endmember is a spectrally distinct component of an image (e.g. soil type 1, soil type 2, vegetation type 1, vegetation type 2, manmade material type 1, etc.).

In the present process, any suitable endmember extraction algorithm may be used as long as it is sufficiently accurate and yields physically plausible reflectance endmembers. In this sense, physically plausible means that if the input reflectance image has no negative values, the resulting endmembers are also positive in all bands, as reflectances normally should be. Sufficiently accurate means that endmembers output by the algorithm are sufficiently different from one another and represent "pure" spectra as much as possible. It is also desirable that endmembers be actual pixels from the image (these are called pixel endmembers). This ensures that the atmospheric effect in these endmember spectra is representative of the image.

Several endmember extraction algorithms currently exist, including N-FINDR, Convex Cone Analysis (CCA), Iterated Constrained Endmembers (ICE), Vertex Component Analysis (VCA), etc. Some of these algorithms can be slow, not easily parallelizable, or produce unphysical negative coefficients or spectra, so not all are necessarily well-suited for use in embodiments of the present disclosure. Another endmember extraction method is the sequential maximum angle convex cone endmember model, often referred to as "SMACC". The SMACC algorithm is described in Gruninger, John H., Anthony J. Ratkowski, and Michael L. Hoke, "The sequential maximum angle convex cone (SMACC) endmember model" Proceedings of SPIE, Vol. 5425 (2004), which is incorporated herein by reference. The SMACC algorithm is based on a convex cone model of the spectral vector data. It selects endmembers directly from the set of pixel spectra while simultaneously generating positivity-constrained expansion coefficients for each pixel in the image. SMACC and other similar algorithms (such as the augmented modified Gram-Schmidt, or AMGS algorithm on which SMACC is based) are efficient and produce physical pixel endmembers and may be suitable for use in some embodiments of the present disclosure. In addition, the number of endmembers is not limited by the number of bands leading to better efficiency since fewer bands may be used. Because of this, in at least one embodiment, endmembers may be extracted using the SMACC or a similar algorithm.

Figure 6:
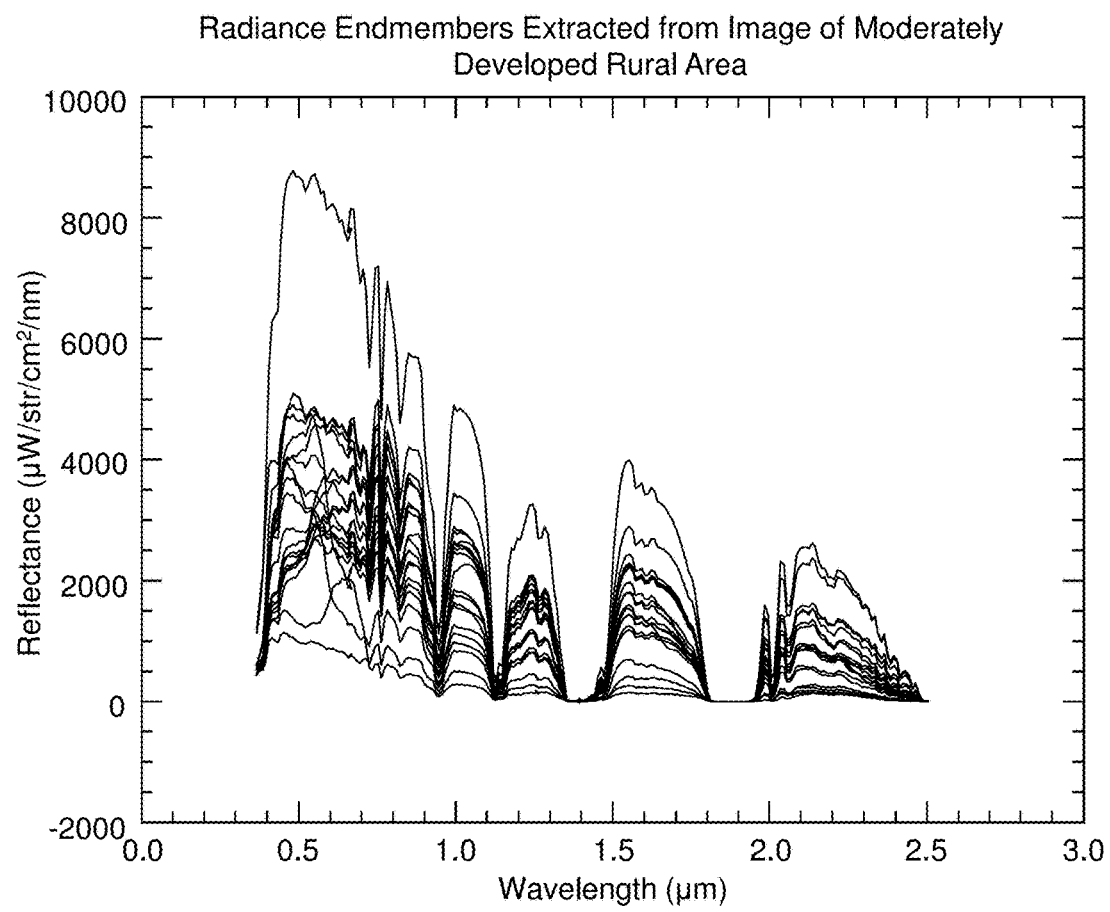
FIG. 6 is a graph showing an example set of radiance endmembers extracted from an AVIRIS image of a moderately developed rural area.

Although the endmembers may be obtained from the TOA reflectance image, in at least one embodiment of the present disclosure the endmember extraction algorithm is implemented to track the location (pixel) of each endmember in the image. This location may be used to obtain the full resolution radiance endmembers from the original image, which may be used to calculate the radiance to reflectance gains and offsets for the entire image and at all wavelengths from a weighed least square regression. The radiance of an example of a set of 20 non-vegetation endmembers extracted from an Airborne Visible/Infrared Imaging Spectrometer (AVIRIS) image of a moderately developed rural area is shown in FIG. 6.

In the present method, the number of endmembers extracted from the image and used for atmospheric compensation may vary. In at least one embodiment, the number of endmembers extracted and used for compensation may be in the range of approximately 20 to 30 endmembers. However, this range is not meant to be limiting. Other numbers of endmembers may be used. Using more endmembers will typically statistically decrease the error in a least square regression used to calculate gain and/or offset values. However, too many endmembers may hinder the correction, since repetition may start to occur, giving too much weight to a given pixel type. Increasing the number of endmembers also increases the amount of processing required, thus there is a trade-off between the number of endmembers used and the amount of processing required.

The process shown in FIG. 4 then proceeds from block 408 to block 410 where the one or more radiance endmembers extracted from the input image may be transformed to at-ground reflectances. This transformation may be considered to be a first pass endmember correction.

The extracted radiance endmembers may be transformed to at-ground reflectances using any suitable method. In some embodiments, the transformation may transform the endmembers to an approximate at-ground reflectance.

In at least one embodiment, a radiative transfer (RT) technique may be used for the transformation. Any suitable radiative transfer technique may be used. Examples include but are not limited to MODTRAN, 6S and FLAASH.

It may be acceptable that the transformation into at-ground reflectance is only relatively accurate. Sufficient accuracy may be achieved when the correction lets most reflectance endmembers be matched to their corresponding library entry when such an entry exists. In such a case, tabulated extinction coefficients and Beer's Law (multiplication of path segment transmittances) may be used to increase the efficiency of this step. Thus in some embodiments, it is not necessary that the transformation be void of errors or spectral artifacts, or to meet the accuracy of full features radiative transfer methods like FLAASH. Again, it may be sufficient that the transformation allows for the chance of finding good matches for the endmembers in a spectral library.

In other embodiments, instead of a radiative transfer technique, one or more other techniques for transforming extracted endmembers into reflectances or approximate reflectances may be used. In at least one embodiment, an empirical or statistical-empirical technique such as the one used in QUick Atmospheric Correction (QUAC) may be used. Other options exist including but not limited to dividing by top-of-atmosphere irradiance and using input from a fiber optic downwelling irradiance sensor (FODIS).

In some embodiments, the first pass correction based on radiative transfer calculations may be made more accurate by the use or more of water retrieval techniques, aerosol retrieval techniques, and measurements of downwelling irradiance.

In at least one embodiment, a pixel-by-pixel based water retrieval algorithm using a tree band ratio may be used. Such an algorithm may be based on a method such as that of Kaufman, Y. J., and Gao B-C. "Remote sensing of water vapor in the near IR from EOS/MODIS." Geoscience and Remote Sensing, IEEE Transactions on 30.5 (1992): 871-884 and of Felde, G. W., Anderson, G. P., Gardner, J. A., Adler-Golden, S. M., Matthew, M. W., & Berk, A. (2004, August). "Water vapor retrieval using the FLAASH atmospheric correction algorithm." In Defense and Security (pp. 357-367). International Society for Optics and Photonics, the two of which are incorporated herein by reference.

Aerosol retrieval used in some embodiments may use methods such as, but not limited to that described by Kaufman, Y. J., and Tanré, D. "Algorithm for remote sensing of tropospheric aerosol from MODIS." NASA MODIS Algorithm Theoretical Basis Document, Goddard Space Flight Center 85 (1998) or presented by Bernstein, L. S., Adler-Golden, S. M., Sundberg, R. L., Levine, R. Y., Perkins, T. C., Berk, A., Ratkowski, A. J., Felde, G., Hoke, M. L., "A new method for atmospheric correction and aerosol optical property retrieval for VIS-SWIR multi- and hyperspectral imaging sensors: QUAC (QUick atmospheric correction)," Geoscience and Remote Sensing Symposium, IGARSS '05. Proceedings. 2005 IEEE International, vol. 5, pp. 3549-3552, (July 2005), the two of which are incorporated herein by reference.

Measured solar irradiance at sensor or ground level may be used in some embodiments to increase the accuracy of either the normalization of radiance data to reflectance or of the first-pass correction. A method such as Homolova, L., Alanko-Huotari, K., & Schaepman, M. E. (2009, August). "Sensitivity of the ground-based downwelling irradiance recorded by the FODIS sensor in respect of different angular positions." In Hyperspectral Image and Signal Processing: Evolution in Remote Sensing, 2009. WHISPERS'09. First Workshop on (pp. 1-4). IEEE, which is incorporated herein by reference, may be used.

In at least one embodiment that uses a fast radiative transfer technique, the radiative technique may be based on lookup tables. The technique may be a single layer analytical delta-Eddington multiple scattering algorithm for downward irradiance calculations, which is described in more detail below. In addition, the technique may incorporate water vapor and aerosol retrieval techniques.

A method for calculating the correction offset from the black level is now described.

Although not necessary in all embodiments according to the present disclosure, it may be useful and more accurate to use the path radiance between the sensor and ground directly to calculate the correction offset. This may be accomplished in several different ways.

One way is simply to find the minimum value for each band in the input image. For even a moderately diverse scene (many types of materials), it is usually a good assumption that at least one material will have a low reflectance in each band. This is true even if no single pixel (material) is dark in every band. The black level curve may then be used directly as an anchor point in a least square regression, which is described further below.

In some cases, either because of spectral artifacts that have not been detected by the masking procedures or because the image does not contain sufficient materials with low spectral reflectance bands, finding the black level offset using the image minimum can fail. It may be more robust to use a true but approximate radiative transfer model to calculate the black level. For example, the total (direct and scattered) downwelling irradiance at ground level may be measured or calculated.

Delta-Eddington single layer two-stream multiple scattering is now described.

As previously mentioned, the more accurate the correction on the endmembers is, the more likely the spectral matching will be accurate and so will the entire atmospheric correction. However, this increased accuracy may come at the price of an increase in computation time. Because of this, a simplified multiple scattering algorithm may be implemented based on the delta-Eddington theory. This theory is described in Joseph, J. H., W. J. Wiscombe, and J. A. Weinman, "The delta-Eddington approximation for radiative flux transfer" Journal of the Atmospheric Sciences vol 33, 12, 2452-2459 (1976); Meador, W. E., and W. R. Weaver, "Two-stream approximations to radiative transfer in planetary atmospheres—A unified description of existing methods and a new improvement", Journal of the atmospheric sciences vol. 37, 3, pp. 630-643 (1980); and Jiménez Aquino, J. I., and J. R. Varela, "Two stream approximation to radiative transfer equation: An alternative method of solution", Revista mexicana de física 51.001 (2009), all three of which are incorporated herein by reference.

A major simplification in the multiple scattering algorithm may be that the atmosphere modeled is composed of a single uniform but representative atmospheric layer. In such a case, the radiative transfer equations can be solved using upper and lower boundary conditions to produce analytical expressions for the upwelling radiative flux $F^+(\tau)$ and the downwelling radiative flux $F^-(\tau)$ at any optical depth $\tau$ within the layer (see previously mentioned references). The lower boundary condition is usually a lambert reflector with the average scene reflectivity $\bar{\rho}$, while the upper boundary condition is either a diffuse flux $F^-(0)$ or a collimated source where the diffuse part is $F^-(0)=0$.

The path radiance may be calculated by integrating the multiple scattering source function multiplied by the transmittance along the path. In at least one embodiment, the source function approximation used may be as described in Isaacs, R. G., et al., "Multiple scattering LOWTRAN and FASCODE models", Applied optics 26.7 (1987): 1272-1281, the contents of which are incorporated herein by reference. This source function approximation is:

$$J_{ms}(\tau, \mu) = \frac{\omega_0}{\pi}\{F^+(\tau)[1-\beta_s(\mu)] + F^-(\tau)\beta_s(\mu)\} \quad (9)$$

where $\beta_s$ is the atmosphere back-scattering fraction and $\mu$ is the cosine of the sensor look zenith angle. The backscattering fraction is defined as the integration of the azimuthally averaged scattering phase function over the backward direction. In at least one embodiment, the following Henyey-Greenstein phase function approximation may be used:

$$P(\mu_{scat}) = \frac{1-g^2}{(1+g^2-2g\mu_{scat})^{3/2}} \quad (10)$$

where $\mu_{scat}$ is the cosine of the scattering angle.

In embodiments in which the approximation of equation (10) is used, the backscattering fraction may be analytically integrated and the results fitted to a fifth degree polynomial in g and tabulated in $\mu$ (linearly interpolated). This is the method used in MODTRAN.

The multiple scattering path radiance becomes $$I_{ms}(\mu) = \frac{1}{\mu}\int_{\tau_s}^{\tau} J_{ms}(\tau, \mu)e^{(\tau_s-t)/\mu}dt \quad (11)$$

where the integration is between the sensor optical depth $\tau_S$ and the ground (total) optical depth $\tau$. $I_{ms}(\mu)$ can be solved by inserting the analytical expressions for $F^+(\tau)$ and $F^-(\tau)$ into equation (9), and since the expressions for fluxes mainly involve simple exponential function, equation (11) can be integrated analytically.

In at least some embodiments, the sensor viewing angle is assumed to be in the nadir direction so that $\mu=1$ in equations (11) and the resulting solution. However, this is not intended to be limiting.

In the case where the upper boundary flux is diffuse, the path radiance is given by equation (11), so that $I(\mu)=I_{ms}(\mu)$. On the other hand, if the upper boundary condition is a collimated source, equation (11) only results in the multiple scattering contribution. The single scattering path radiance must be added by using the Henyey-Greenstein phase function given in (10) so that $$I(\mu) = I_{ms}(\mu) + \frac{\omega_0 P(\mu_{scat})S_n}{(\mu_0^{-1}+\mu^{-1})}[e^{-\tau_s/\mu_0} - e^{[\frac{\tau_s}{\mu}-\tau_1(\mu_0^{-1}+\mu^{-1})]}] \quad (12)$$

where $\mu_{scat}$ is the solar scattering angle, $\mu_0$ is the cosine of the collimated source zenith angle and $\tau_1$ is the optical depth from the TOA to the ground. Again, it may be assumed that the look angle is towards the nadir, so that $\mu_{scat}=\mu_0$ and $\mu=1$ in equation (12). Note that using a more accurate representation of the phase function may produce more accurate results here.

We now return to the transformation of the radiance endmembers into approximate at-ground reflectance. Again, this step is represented by block 410 in FIG. 4.

The radiance endmembers may be transformed to at-ground (e.g. intrinsic) reflectance by calculating the necessary gain and offset. In at least one embodiment, when the upper boundary flux is diffuse, the black level is the path radiance as calculated with equation (11). In the case where upper boundary condition is a collimated source, then the black level may be the path radiance as calculated according to equation (12).

In a case where the downwelling flux is considered to be isotropic (clouds), the gain may be calculated by $$\alpha = \frac{\pi}{\exp[-(\tau_1 - \tau_s)]F^-(\tau_1)} \quad (13)$$

which is the scattered downwelling flux at ground level multiplied by the ground to sensor transmittance (assuming a nadir look angle).

When the downwelling flux (TOA or FODIS) is a collimated beam (sun), the gain in most instances includes the direct transmitted solar irradiance $$\alpha = \frac{\pi}{\exp[-(\tau_1 - \tau_s)]F^-(\tau_1) + \exp(\tau_0 - \tau_1/\mu_0)S_n\mu_0} \quad (14)$$

Note that contrarily to equations (1) through (7), the adjacency corrections are not explicitly stated in equations (13) and (14) since the delta-Eddington multiple scattering calculates them implicitly by setting the bottom condition as the (approximate) average image reflectance $\bar{\rho}$.

The correction offset can be calculated from the black level b (as obtained from the image or modeled) by $$\beta = -b\alpha \quad (15)$$

Figure 7:
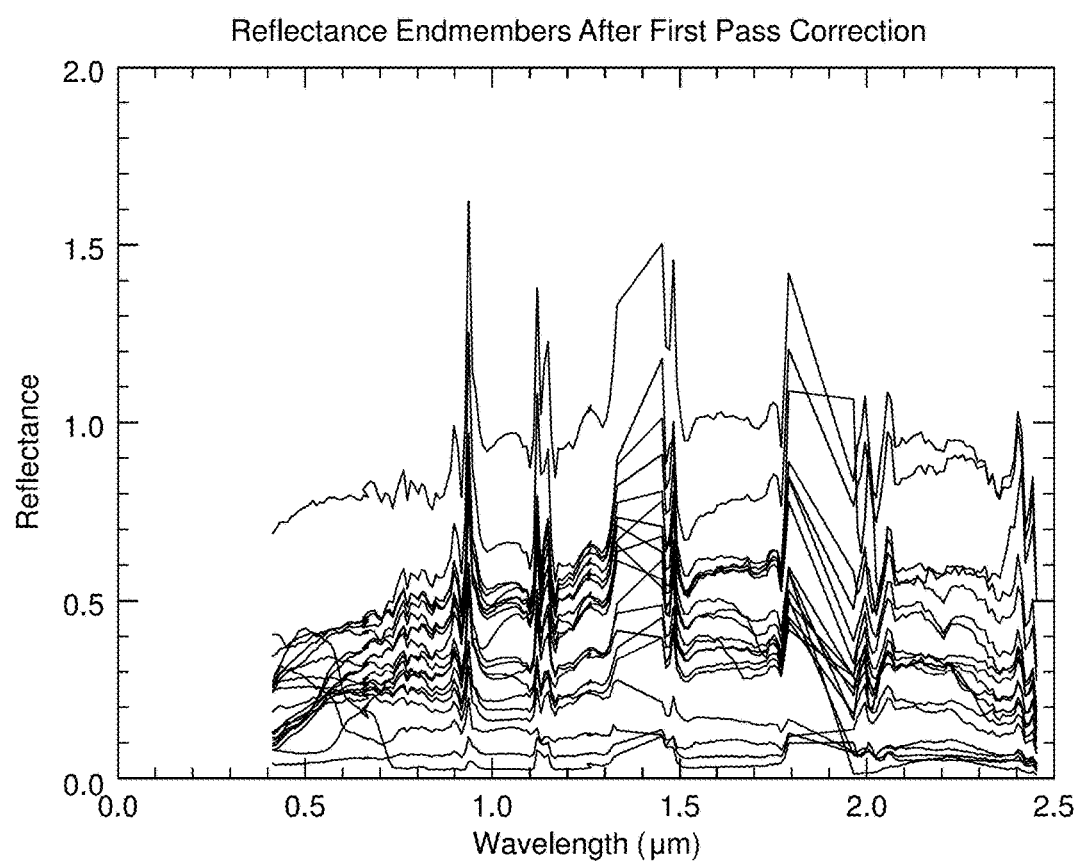
FIG. 7 is a graph showing the extracted endmembers of FIG. 6 after a first pass correction (e.g. transformed into approximate reflectance)

FIG. 7 shows the endmembers of FIG. 6 after they have been transformed (or corrected) into an approximate at-ground reflectance.

The resulting correction may generally not be of the same quality as if corrected by algorithms such as FLAASH because of the approximations used. Nevertheless, the correction may be generally sufficient in order to enable the matching of the corrected endmembers to a spectral library.

The process shown in FIG. 4 proceeds from block 410 to block 412, in which at least one endmember that was extracted from the input image and transformed to approximate reflectance is compared against a spectral library, which may contain a wide variety of materials. In some embodiments, most or all extracted endmember are compared to the spectral library.

The spectral library may comprise of high quality reflectances (e.g. in terms of quality of the samples preparation, instrument calibration, reflectance standards used and of the measurement protocol) for commonly found surface materials, which may include both natural and manmade materials. In some embodiments, a generic library may be used as a default. However, better overall performance may be achieved in some embodiments by using a library that better reflects or corresponds to the types of endmembers likely to appear in the image to be taken. For example, the components of the library may better represent the geographical location where the input image is taken. For example, a spectral library may contain more components for endmember spectra commonly found in arid environments when the image to be taken in such an environment. Furthermore, library components for endmember spectra that are unlikely to be found in the environment in which the image is to be taken may be removed from the library. For instance, snow reflectances may be removed from a library if an image is to be collected in an environment where there is no snow. In addition or alternatively, the library may be supplemented with in-situ reflectances, or may even consist solely of in-situ reflectances. However, in some circumstances, in-situ reflectances may not be available prior to the time at which an image is collected and therefore may not form part of the library.

In at least one embodiment, a spectral library may be composed of spectra that are common enough and likely to be present in a hyperspectral image in pure form in an unmixed pixel, are sufficiently different from one another, and cover a wide range of reflectances in all spectral regions.

For example, in one embodiment that has been tested, the spectral database was composed of 213 spectra that are a combination of manmade material, soil, mineral, vegetation and snow spectra from the Johns Hopkins University (JHU) Spectral Library and the U.S. Geological Survey (USGS) Digital Spectral Library libraries that are provided with the ENVI software, complemented with dry vegetation spectra from Elvidge, C., D., "Visible and near infrared reflectance characteristics of dry plant materials", Remote Sensing vol. 11, 10, pp. 1775-1795 (1990), which is incorporated herein by reference. However, this is not intended to be limiting. Other libraries or subsets thereof may be used.

The one or more extracted and transformed endmembers are compared to the components (or "entries") in a spectral library in an attempt to find a best match between a given endmember and a component in the spectral library. In at least one embodiment, the comparison may be done automatically, meaning without any user intervention. For example, in some existing correction techniques, such as standard ELM, a human operator identifies (e.g. by clicking with a mouse, entering the coordinates, etc.) of pixels in an image that are known to be associated with specific spectra (e.g. known targets). In contrast, in some embodiments of the present disclosure, the comparison and matching may be done automatically.

The set of components in the library to which an endmember is compared may be referred to as a comparison set. In some embodiments, the comparison set comprises at least some of the components in the library. In some embodiments, the comparison set comprises every component in the library. A metric or score indicating the relative degree of the match between an endmember and the library component may be computed for each component in the comparison set. A matching library component for the given endmember may then be selected based on the metrics or scores that were computed for the components in the comparison set. For example, the library component selected as the match may be the component that has the highest or lowest metric or score value. However, other ways of selecting the matching component are possible.

The comparison between an endmember and a library component may be made using any suitable endmember matching technique or metric. In at least one embodiment, the following equation may be used:

$$F = D_s \tan(\theta_s) \quad (16)$$

where F is the metric and $\theta_s$ is the spectral angle between an extracted endmember and a spectral library component. A small $\theta_s$ indicates that the two spectra have a similar shape. $D_s$ is the Euclidean distance between the library and data reflectance spectrum:

$$D_s = \sqrt{\Sigma[\rho_{lib} - \rho_{data}]^2} \quad (17)$$

and $\theta_S$ may be calculated by $$\theta_s = \cos^{-1}\left(\frac{\langle \rho_{lib}, \rho_{data} \rangle}{|\rho_{lib}||\rho_{data}|}\right) \quad (18)$$

where < > denotes the dot product.

This F metric tends to match spectra that are similar in both shape and amplitude. Therefore the value of metric F decreases as the degree of matching between the extracted endmember and a spectral library component increases.

As mentioned above, any suitable endmember matching technique or metric may be used. Other possible metrics include but are not limited to normalized spectral distance and spectral information divergence (SID).

As mentioned above, an endmember maybe compared to every library component in the comparison set. Therefore in an embodiment where the above F metric is used, the metric may be computed for every library component in the comparison set. One library component is then selected as the match for the particular endmember. The endmember and the selected library component may be referred to as an endmember-library component pair.

A matching procedure may be performed for each of one or more endmembers extracted from the input image. In at least some embodiments, every extracted endmember is compared against the spectral library.

Figure 8:
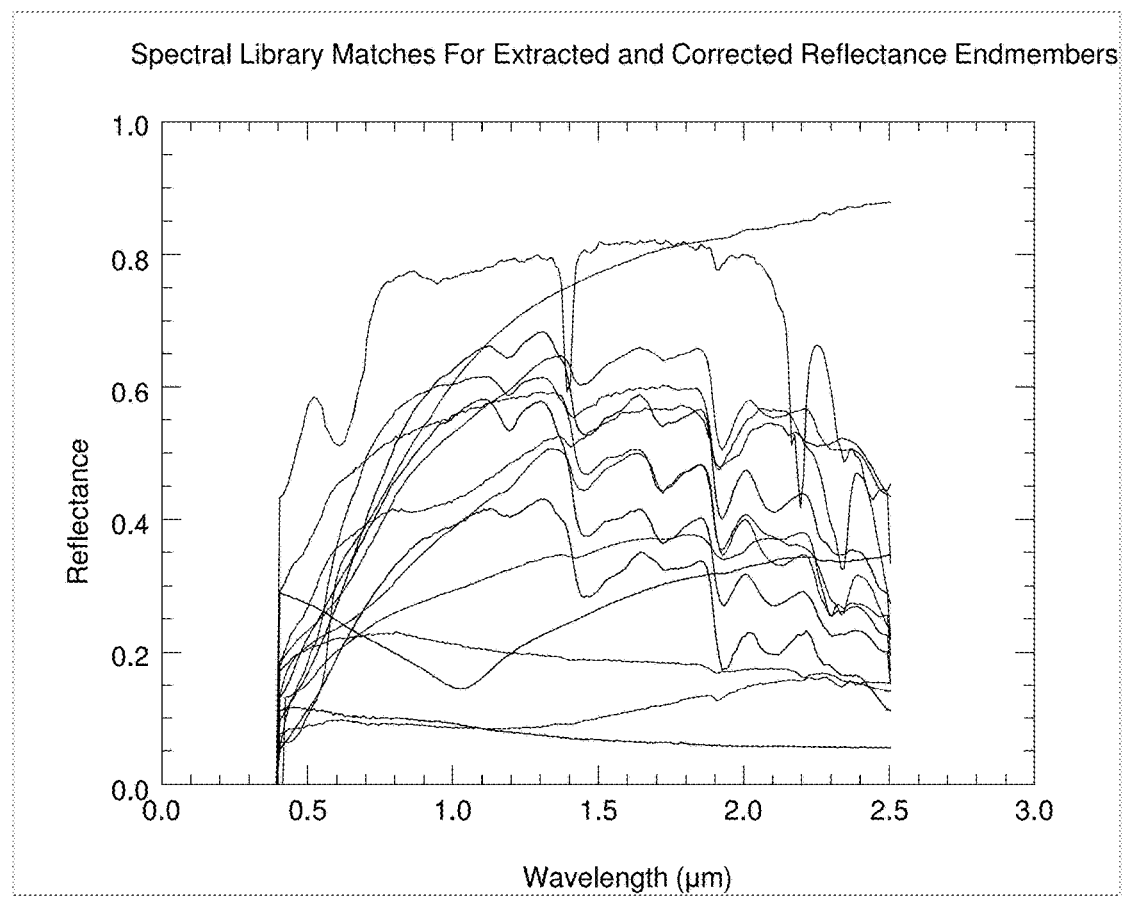
FIG. 8 is a graph showing the library matches in an example library for the extracted and corrected reflectance endmembers shown in FIG. 7.

FIG. 8 shows best library matches in an example library for the extracted and corrected reflectance endmembers shown in FIG. 7.

The resulting metrics and endmember-spectral library component pairs may then be passed to the next step.

Once the one or more extracted endmembers have been compared to the spectral library and a best match is found for the one or more endmembers, the process proceeds from block 412 to block 414 where a gain and an offset value are calculated. The gain and offset may be calculated using the one or more matched endmember-spectral library component pairs. In addition, a gain value and an offset value may be determined for each of a plurality of spectral bands in the image.

Gain and offset values may be calculated using a regression technique in which a line is fitted to a data set comprising the matched endmember-spectral library component pairs. In at least one embodiment, a weighted least square regression technique may be used. In order to calculate the final gain and offset, a weighed linear regression may be made at each image spectral band using the radiance endmember data points and the corresponding set of matched library spectral points.

Figure 9:
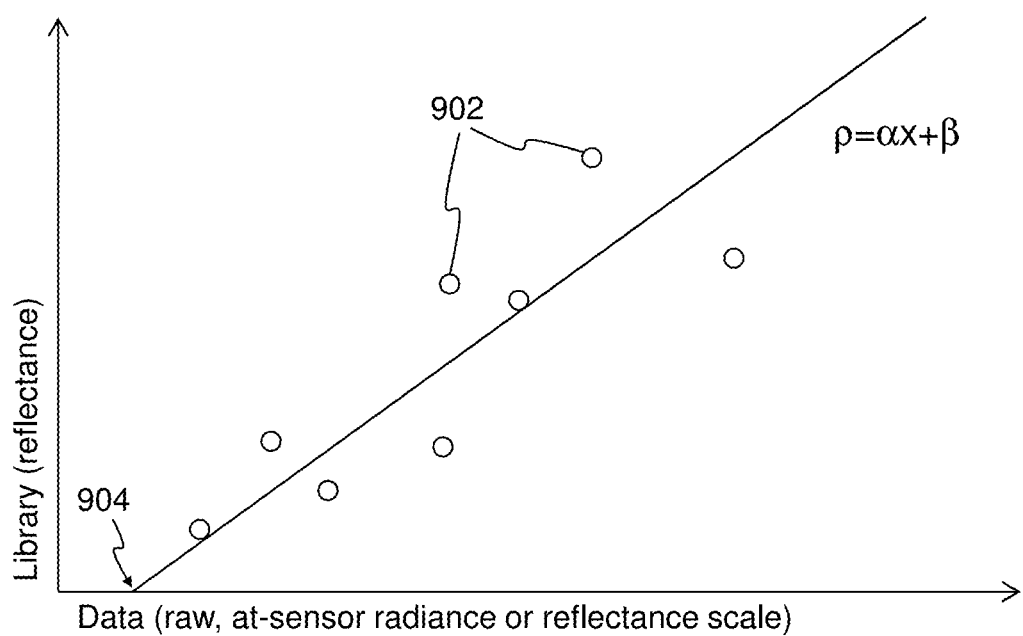
FIG. 9 is a graph representing a least square regression method for calculating gain and offset values.

A graph containing example data of matched endmember-spectral library matched pairs is provided in FIG. 9. The plot represents the library reflectance versus the endmember measurement data for a given spectral band. Each dot or circle 902 represents an endmember-library component pair. The line represents the regression fit. The line slope represents the gain, while the abscissa intercept 904 represents the black level and is related to the offset by equation (15).

Each endmember-spectral library component pair may be assigned a weight in any suitable way. In at least some embodiments, the weight assigned to each endmember-spectral library component pair may be proportional to the degree of matching between the two. In other words, well-matched pairs may be assigned higher weights than poorly-matched pairs.

Weights may be assigned based on a metric used in the endmember matching step. In the above example where the equation $F=D_s \tan(\theta_s)$ is used in the matching, the weight to be assigned to each endmember-library component pair may be inversely proportional of the 'F' metric value. In one embodiment, the assigned weight may be the inverse of the F metric value, that is 1/F. As noted above, since the value of F decreases as the degree of matching increases, higher matching endmember-library component pairs are assigned higher weights. Similarly, lower matching endmember-library component pairs are assigned lower weights. Thus foreign materials in the scene, meaning materials that have a poor or no match in the spectral library, are therefore less likely to affect the final correction.

In addition, the assignment of lower weights to poorer matches between extracted endmembers and library components may reduce the negative effect of any bad or unwanted pixels on the overall result. For example, in some embodiments, bad pixels are not masked. In other situations, one or more bad pixels may be missed in the masking process. In either case, a bad pixel is unlikely to have a good match or even any match at all in a spectral library. Accordingly, using a weighting where poor matches are assigned a low weight reduces the negative effect the one or more bad pixels has on the final result.

Furthermore, in some embodiments, an image black level may be determined. The darkest value in each spectral band of the input image to be corrected may be calculated. In even moderately diverse scenes (e.g. having many types of different materials), it is typically a good assumption that at least one material will have a low reflectance value in each band. This is typically the case even if no single pixel (material) is dark in every band.

The resulting black level signal corresponds to the path radiance. The black level signal may be used to directly determine the offset instead of or in addition to calculating the offset another way, for example by using a least square regression technique as described above. In another embodiment, the black level signal may be used in association with another way of calculating the offset, for example to provide redundancy, improve accuracy, etc. For example, offset values may be calculated in two or more ways and then used to derive a single value to be used in the compensation of the input image. For example, two or more offset values may be averaged. However, other ways of arriving at a single offset value are possible.

A regression used to calculate gain and offset values may be anchored at the abscissa intercept by adding the data-library value pair (black level, 0) and setting its weight to numerical infinity (or a very large value). The black level may be obtained in any suitable way, including from the image minimum or using the results of the radiative transfer. In the situations where a proper black level may be obtained, doing this removes a degree of freedom from the linear regression and usually produces better results. For example, more accurate values may be obtained for low reflectance materials. On the other hand, having a proper black level is not critical to the atmospheric compensation algorithm functioning correctly, and thus is not necessary in all embodiments.

In other embodiments, different methods for obtaining the gain may be used. For example, a weighted average may be obtained for both the data and library endmembers. The gain may simply be the negative of the black level, and the gain may be given by $$\text{Gain} = \frac{\text{library mean}}{\text{data mean} - \text{data black level}} \quad (19)$$

Figure 10:
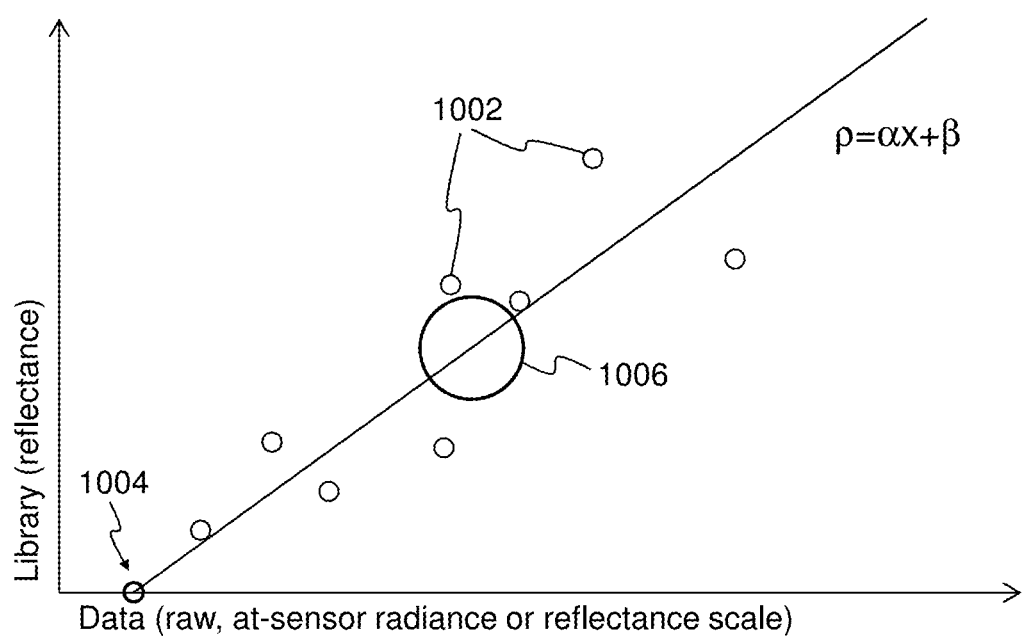
FIG. 10 is a graph representing a weighted average of endmembers method for calculating gain and offset values.

A graph showing example data in this embodiment is provided in FIG. 10. Similar to the graph of FIG. 9, in FIG. 10 each dot or circle 1002 represents an endmember-library component pair. The line represents the regression fit. The line slope represents the gain, while the abscissa intercept 1004 represents the black level related to the offset trough equation (15). The large circle represents weighted mean value of all of the endmember-library component pairs.

The process of FIG. 4 proceeds from block 414 to block 416 where the calculated gain and offset values are applied to pixels in one or more bands of the input image to generate a compensated (or "corrected") reflectance image. The gain and offset values may be applied using equation (4). In some embodiments, the gain and offset may be applied to substantially all pixels in the input image.

The process then proceeds from block 416 to block 418 and ends.

Figure 11A:
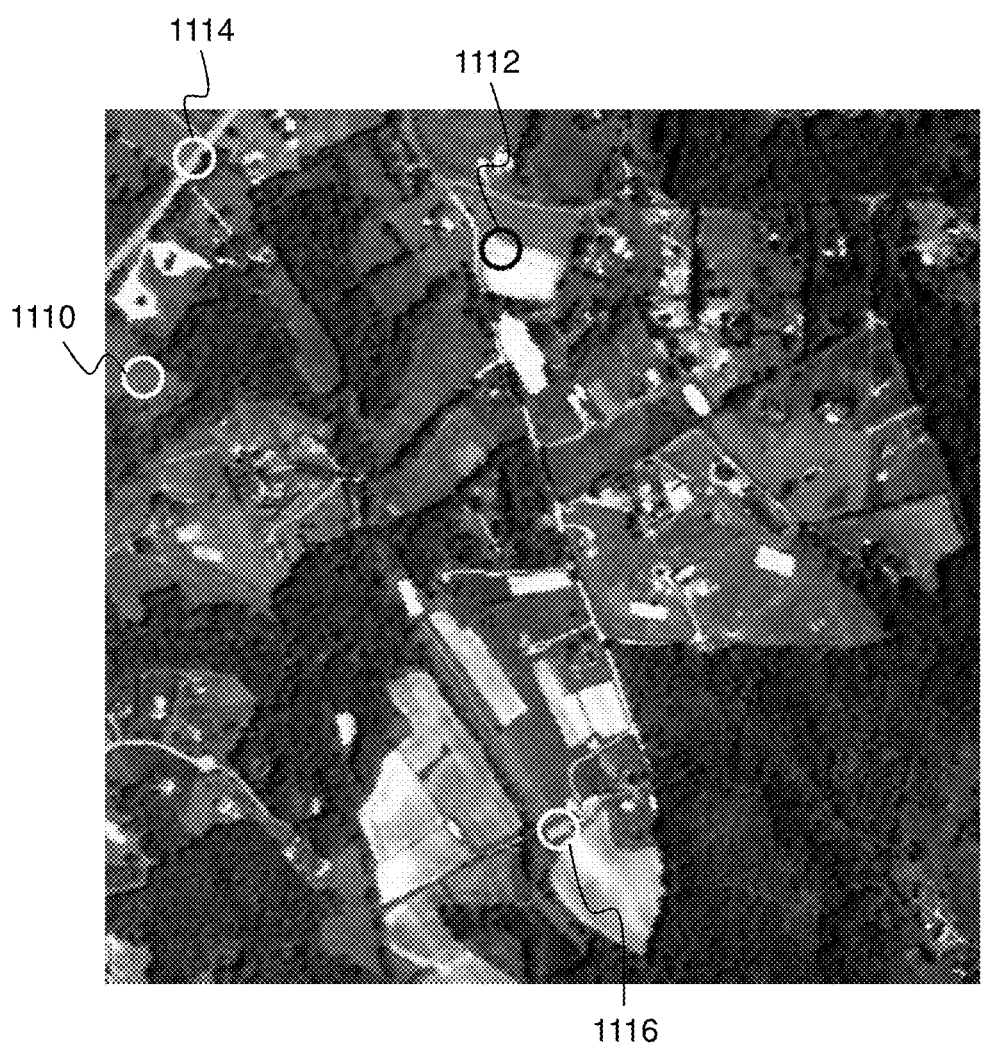
FIG. 11A is a portion of an AVIRIS sensor image compensated (or "corrected") using an algorithm according to the present disclosure.
Figure 11B:
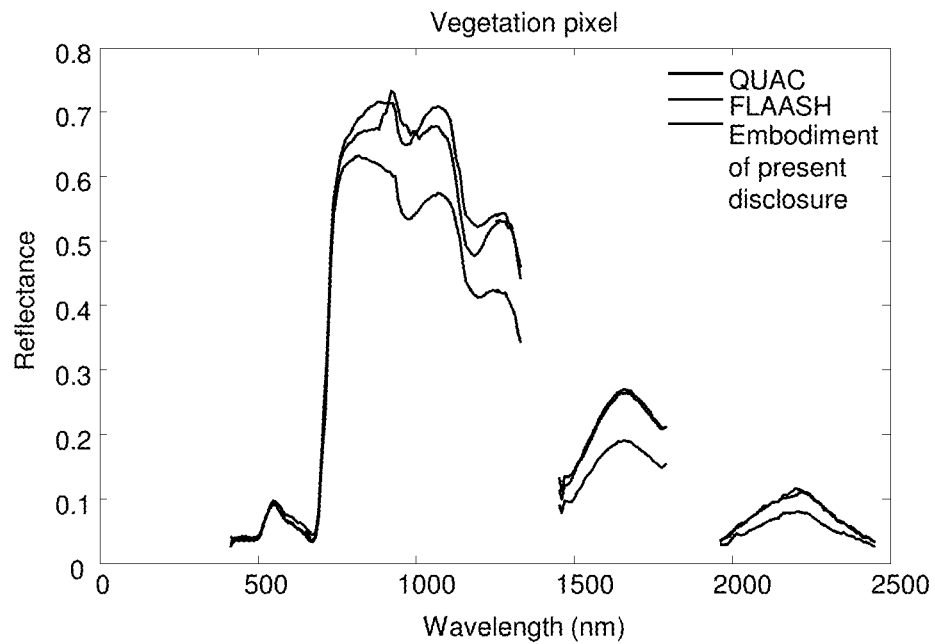
FIGS. 11B, 11C, 11D and 11E are graphs representing pixel reflectance spectra for vegetation, dry vegetation, a road and a blue roof, respectively, indicated in FIG. 11A as corrected by QUAC, FLAASH and an algorithm according to the present disclosure.
Figure 11C:
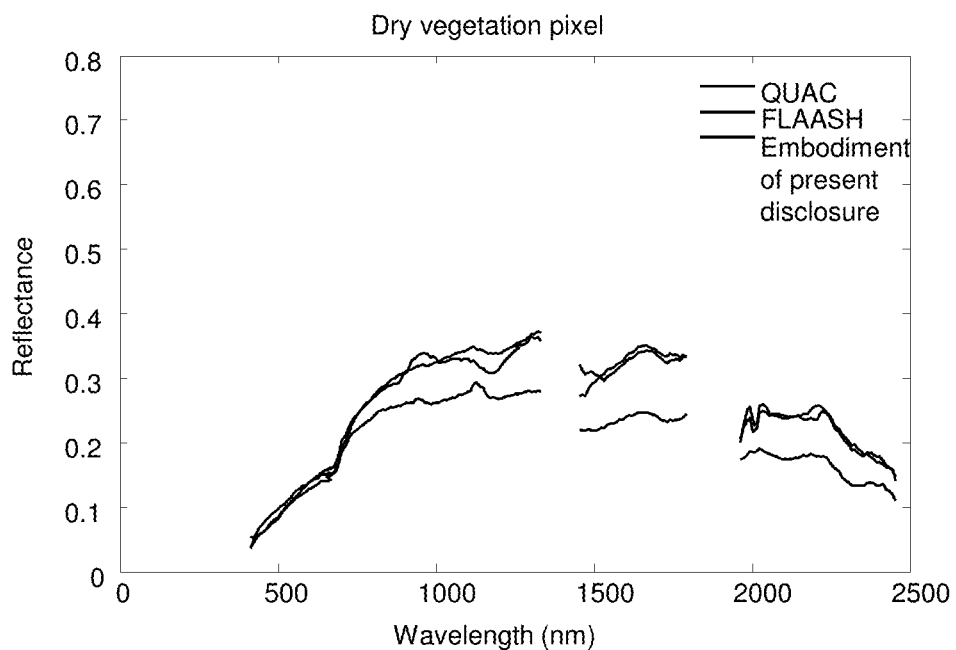
Figure 11D:
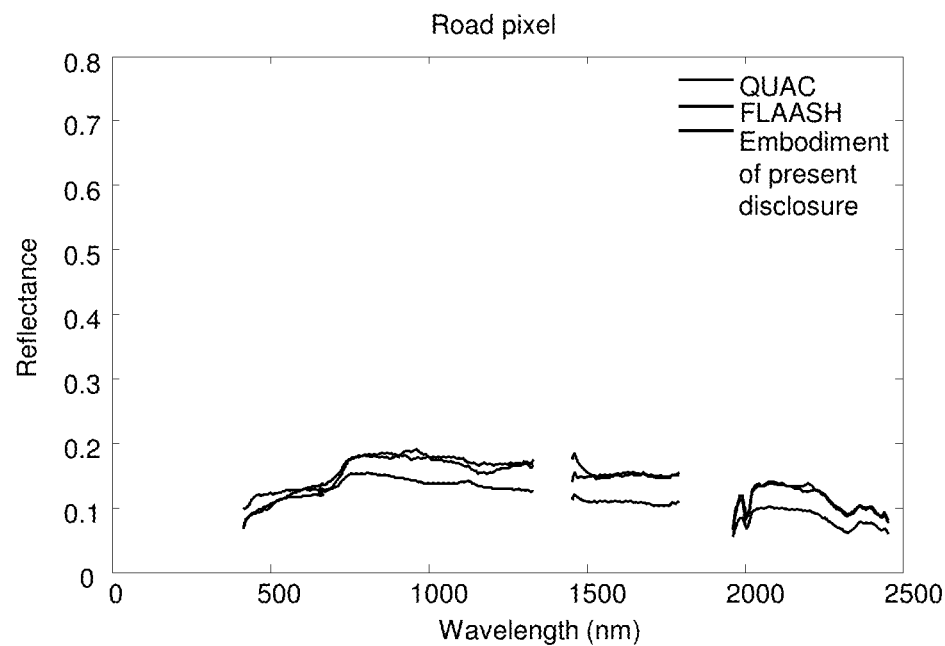
Figure 11E:
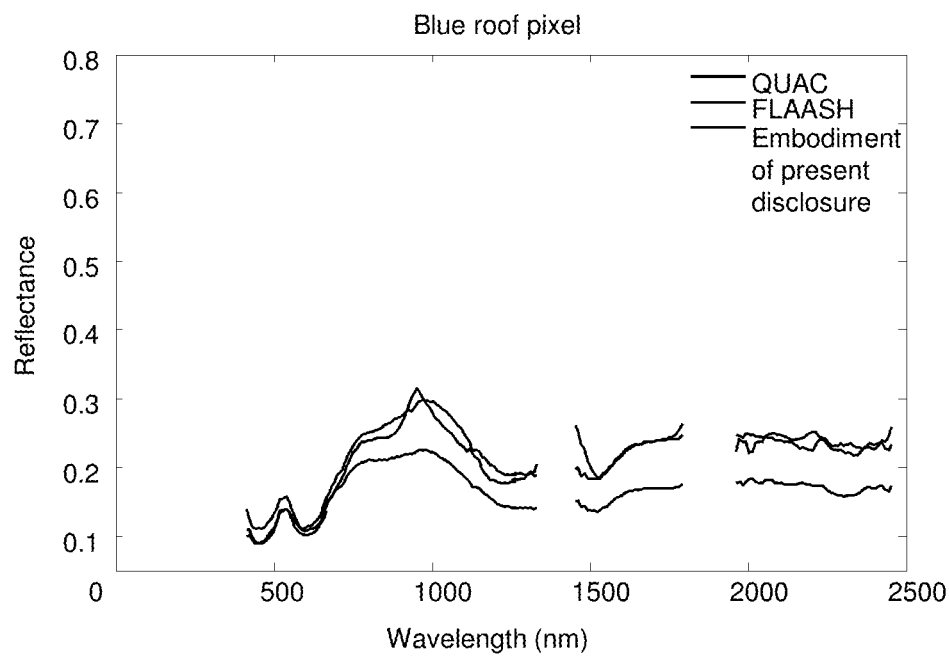

FIG. 11A shows a portion of an AVIRIS sensor image compensated (or "corrected") using an algorithm according to the present disclosure. Indicated in FIG. 11A are pixels of vegetation 1110, dry vegetation 1112, a road 1114 and a blue roof 1116. FIGS. 11B, 11C, 11D and 11E are graphs representing reflectance spectra for the vegetation, dry vegetation, road and blue roof pixels, respectively, corrected by QUAC, FLAASH and an embodiment of the present disclosure. As seen in FIGS. 11B-11E, the algorithm according to the present disclosure produces a correction similar to FLAASH for the four different pixels 1110, 1112, 1114 and 1116.

In some embodiments, for example where a least square regression is used to obtain the gain and offset for each spectral band, a regression error may be computed for one or more bands of the input image. This spectral regression error may be passed on to exploitation algorithms (e.g. target detection and others). An exploitation algorithm may then be able to reject one or more bands where the correction is deemed less accurate from their treatment. For example, certain bands might be omitted from participating in a target detection algorithm if the regression error is above a certain threshold.

Some embodiments of the present disclosure may have an acceptable performance with as few as two extracted endmembers having good matches in the spectral library. In some embodiments, it is desirable that the at least two extracted endmembers are sufficiently different in most or all of the spectral bands of the image being corrected. In addition, an acceptable performance may be achieved using one extracted endmember having a good library match and an image black level. In contrast, some other existing atmospheric compensation algorithms require many endmembers. For example, some versions of QUAC require at least 10 different endmembers.

In addition, in embodiments of the present disclosure where several endmembers are used, errors in the compensation process may be averaged out. It may be unreasonable to expect perfect matches between endmembers and the library. Some discrepancies may lead to an overestimation of the surface reflectance while others to an underestimation of the reflectance. However, on average these discrepancies may tend to cancel out.

The present disclosure provides advantages over existing atmospheric compensation techniques.

At least some embodiments of the present disclosure do not require a priori information of in-scene targets or materials.

In addition, at least some embodiments of the present disclosure have a lower degree of computational complexity or require less processing time compared to other atmospheric compensation techniques.

Figure 5A:
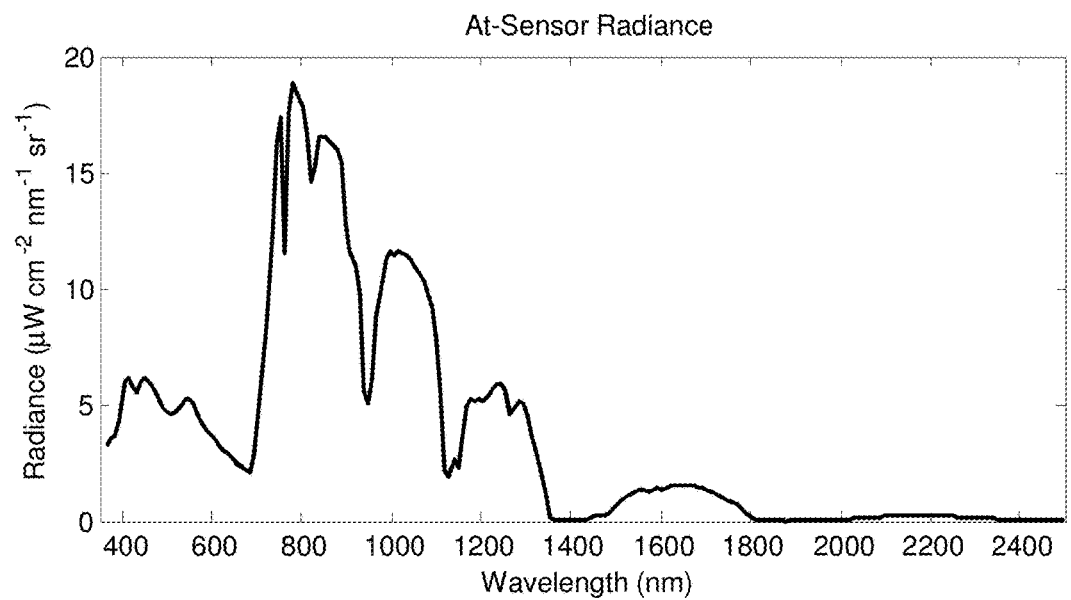
FIGS. 5A to 5D are graphs representing the states of an example pixel at various steps in an algorithm of the present disclosure.
Figure 5B:
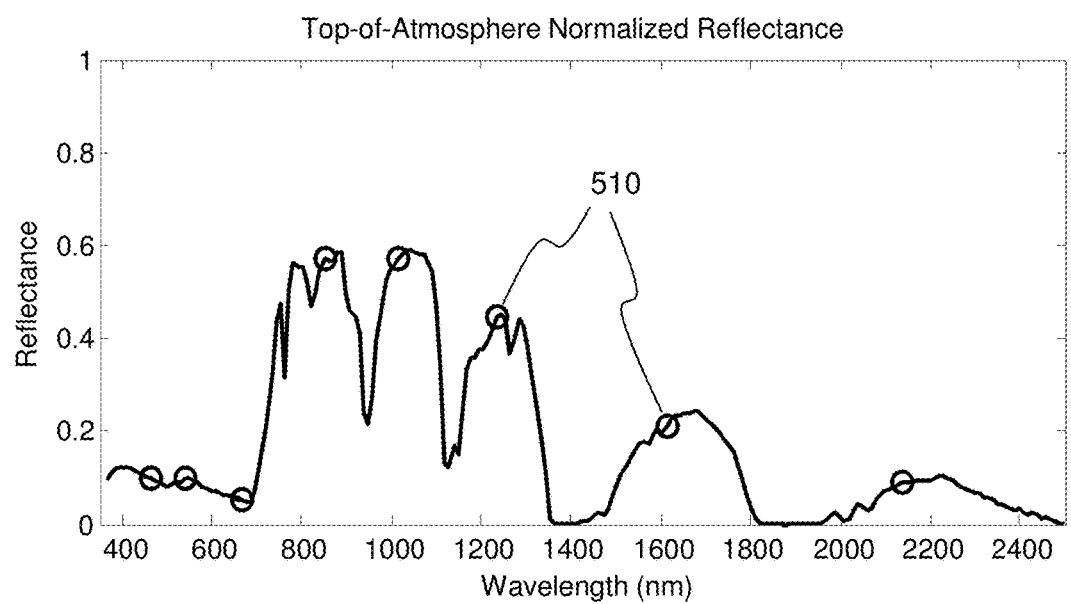
Figure 5C:
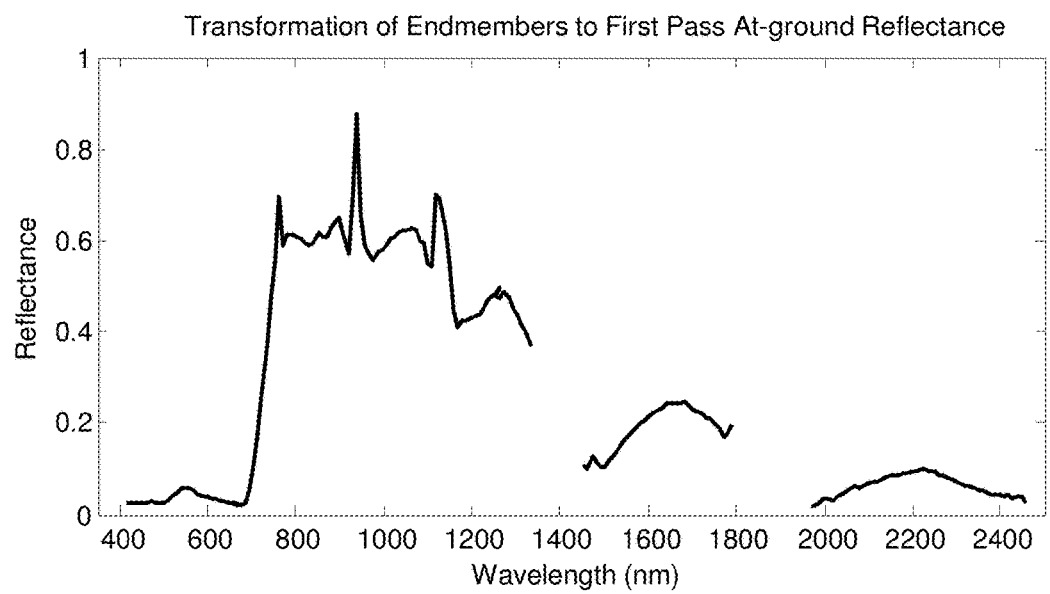
Figure 5D:
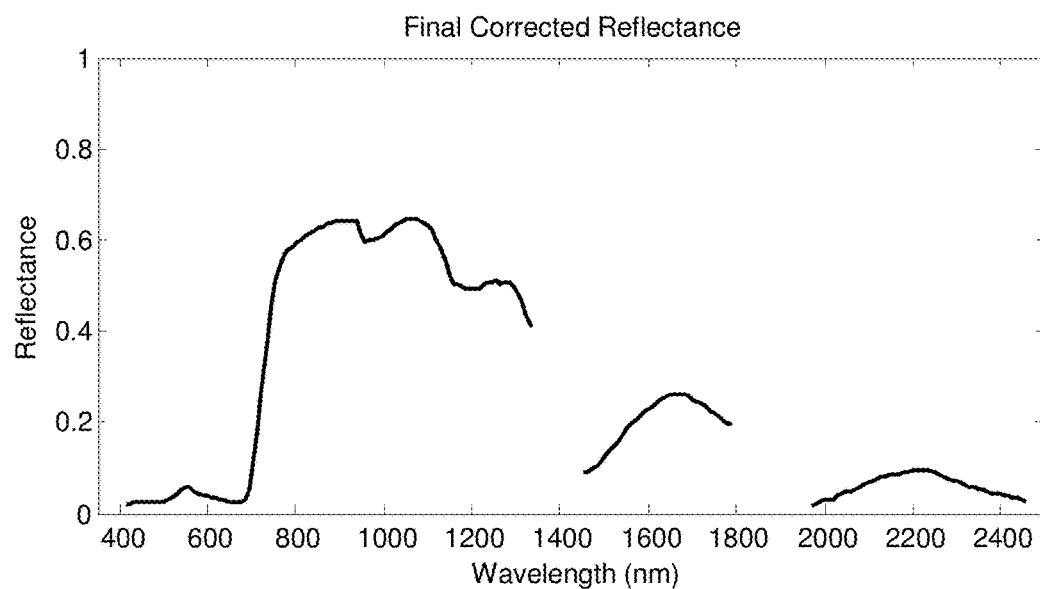

FIGS. 5A to 5D show the state of an example vegetation pixel at various steps in an algorithm according to the present disclosure. FIG. 5A is a graph of the at-sensor radiance of the pixel versus the wavelength. FIG. 5B is a graph of the top of atmosphere reflectance of the pixel after the input image has been normalized using top of atmosphere irradiance. The points on the graph indicated by circles 510 are points used for endmember extraction. While FIG. 5B illustrates using a small subset of all the bands (points), the resulting number of endmembers may be more than the number of bands used (if allowed by the endmember extraction algorithm) or less than the number of bands used. FIG. 5C is a graph of the at-ground (or at-surface) reflectance of the pixel after the endmembers have been transformed into approximate at-ground reflectance using an approximate radiative transfer model correction. FIG. 5D is a graph of the at-ground reflectance of the pixel after the input image has been corrected using calculated gain and offset values determined using matched endmember spectral library pairs.

Other features and aspects of the present disclosure are now described.

In one aspect, the present disclosure provides methods for removing the effect of water absorption from a multi or hyper spectral image as part of an atmospheric compensation method. In particular, methods for correctly removing the effect of water absorption when the column amount of water varies across the scene are provided. A column amount of water varying across the scene can happen for example near a coastline where water vapor is more prevalent near the shore, and is also found in uneven terrain, since water vapor is reduced at higher altitudes.

Therefore a method of the present disclosure for removing the effects of water absorption on pixels in an image uses retrieved water vapor values for each pixel as well as an average water vapor value for the whole image. Pixels may be separated or designated into at least two groups: those with water vapor content higher than the image average, and those with water vapor lower than average. The pixels may be separated using water vapor values retrieved from the image. Endmembers, black levels, aerosol properties, and finally gain and offset may all be derived, for example using methods and techniques described above, for each of the two groups of pixels.

In at least one embodiment, the gain and offset for the lower water content group may be the gain and offset of a pixel having the average water vapor content in that group. Similarly, the gain and offset for the high water content group may be the gain and offset of a pixel having the average water vapor content in the high water content group. Gains and offsets may be determined in any suitable way, for example using any of the methods and techniques described herein. For any other water content value found in the image, the gain and offset for that pixel may be interpolated/extrapolated linearly between the low and high average water contents.

Figure 12:
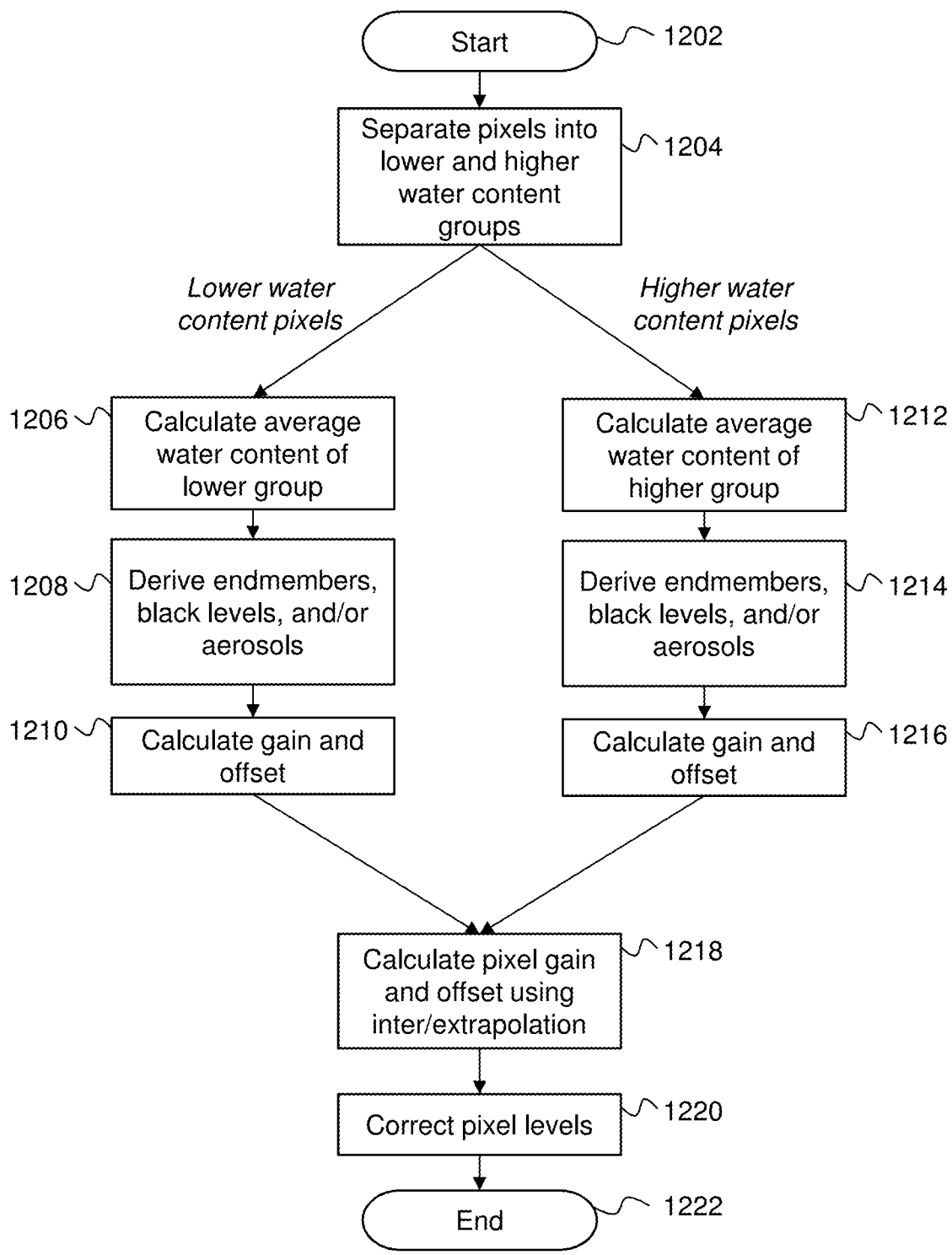
FIG. 12 is a flow diagram of a process for correcting for the effects of water absorption.

A flow diagram of an example process for correcting for the effects of water absorption according to the present disclosure is shown in FIG. 12. The process begins at block 1202 and proceeds to block 1204 where pixels in a set of pixels are divided into two separate groups: a lower water content group and a higher water content group. As mentioned above, the pixels may be divided using a calculated average vapor water content value for the pixels of the image. However, other values and techniques may be used for dividing the pixels into the two or more groups, for example a calculated median vapor water content value.

Similar steps are then performed using the lower water content and higher water content groups. In particular, the process proceeds to blocks 1206 and 1212, where the average retrieved water vapor content of the lower water content group and of the higher water content group are determined, respectively. The process then proceeds to blocks 1208 and 1214 where endmembers, black levels and aerosol values are derived for each group, respectively. From blocks 1208 and 1214, the process proceeds to blocks 1210 and 1216, respectively, where gain and offset values are calculated for each of the two groups. The steps performed in blocks 1208, 1210, 1214 and 1216 may be performed in any suitable way, including using any of the methods, algorithms or embodiments described above.

In at least one embodiment, the calculated average water vapor content for one or both of the lower and higher water content groups may be used in a first pass correction (e.g. transforming endmembers to at-ground reflectance). Although not shown in FIG. 12, the first pass correction may be performed between blocks 1208 and 1210 for the lower water content group, and/or between blocks 1214 and 1216, for the higher water content group.

The gain and offset values calculated in blocks 1210 and 1216 may be considered to be the gain and offset values of a pixel having the average water content of each of the lower and higher content groups, respectively.

The process then proceeds from blocks 1210 and 1216 to block 1218. For pixels having water content values other than the lower and higher average values, the gain and offset for that pixel are interpolated/extrapolated linearly between the lower and higher average water content values using the retrieved water vapor content for the particular pixel. Thus gain and offset values may be determined for each of several bands of individual pixels in the image. This is unlike previously described atmospheric compensation methods that determine a gain and offset value for each of several spectral bands for the whole image, not for each of several spectral bands of individual pixels of the image.

The process then proceeds to block 1220 where the pixels in the original image are corrected using the calculated gain and offset values. The process then proceeds to block 1222 and ends.

Compared to existing methods, a process according to the one shown in FIG. 12 does not rely on direct correction of the water vapor absorption through modeled transmittance curves, which can introduce undesirable features near water bands. The present process uses in-scene elements for the correction, and thus may continue to benefit from the benefits of in-scene corrections, while effectively managing cases where water vapor variation exists. At least some embodiments of the present process correct for water vapor on a pixel by pixel basis. In addition, other atmospheric effects that are correlated with water vapor content along the line of sight may implicitly be corrected by this process. For example, aerosol optical properties are often correlated with water vapor content of the atmosphere. Also, differences in optical path lengths from pixel to pixel (caused by uneven terrain, non-vertical look angles, wide fields of views) may also be corrected, since the column amounts of aerosols and other absorbing gases will vary along with water vapor The present process may also be used to correct other types of variations across the scene, particularly when these variations are quantifiable. For example, the present process may be used to correct for the presence of cirrus clouds, particularly when the amount of cirrus is quantifiable on a pixel basis.

In another aspect, the present disclosure provides methods for correcting for shadows or other illumination variability in a scene.

Shadows and other illumination variability in a scene can occur for example because of broken clouds, trees, buildings or terrain topography. This variability can hamper target detection or surface characterization algorithms since it will usually have some effect on the observed spectral signature. This is because shadows do not simply scale down the reflectance spectrum, but typically add a blue cast because the surfaces are illuminated mostly by the sky.

Correcting these effects is not necessarily a simple task. This is especially true when no prior knowledge of the scene content, for example height of trees, presence of clouds, etc., or topography is known. In such cases, it may be difficult to distinguish between shadows and dark surfaces.

One technique often employed to detect shadows is the use of a shadow endmember. Once most pixels in a scene can be described by a sum of endmembers with associated abundances, the shadow endmember is basically what is required for the sum of abundances to reach unity as should be the case for reflectances and when abundances are prevented from being negative. One problem with this approach is that it does not give the source of illumination for what remains. In order to properly correct for shadows, it is desirable to know what proportion of the pixel remaining illumination is from the sky and what proportion is from the sun. This is because the sun and sky have different spectral signatures and therefore typically affect the signature of the surface differently.

Figure 13:
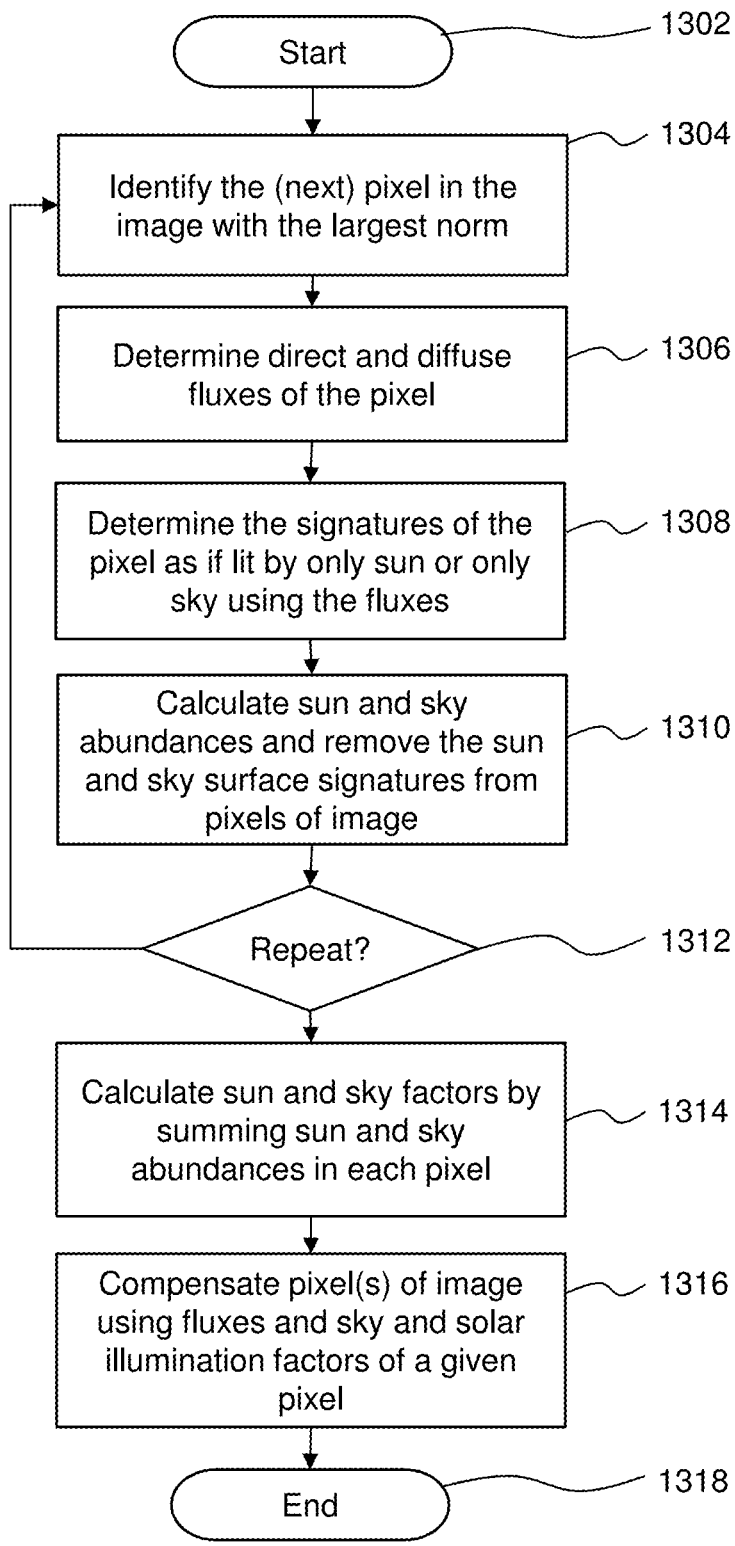
FIG. 13 is a flow diagram of a process for correcting for the effects of shadows in an image.

According to the present disclosure, a method is provided that attempts to solve this problem and correct (i.e. remove), as best as possible, shadows in a scene. The method is based on the assumption that the endmembers of a scene are fully lit by direct and diffused sunlight. FIG. 13, which is described in more detail below, shows a flow diagram representing a method of at least one embodiment. In at least one embodiment, the method relies on the augmented modified Gram Schmidt (AMGS) method for iterative endmember extraction algorithm (basically SMACC without the positivity and sum constraints) as described in Rice, J. R., Experiments on Gram-Schmidt Orthogonalization, Math. Comp. 20 (1966), 325-328, which is incorporated herein by reference. The method starts by finding the brightest pixel in the scene and sets it as the first endmember in an iterative endmember extraction process. A brightest pixel may be the pixel with the largest norm (square root of the sum of the squares of the spectra values). The signature from that pixel may be removed from all other pixels by any suitable way of spectral unmixing, including but not limited to projection. The unmixing may also find or determine the abundance of that endmember in each pixel. This procedure may be repeated for a desired number of times, or until the largest residual pixel signature reaches a given tolerance (e.g. until the norm of the pixel last identified as the brightest pixel remaining in the image is below a predetermined threshold value).

In at least one embodiment, the AMGS algorithm is modified in order to find the proportion of sun and sky illumination within a pixel. The brightest pixel found at each pass is always assumed to be fully illuminated by both sun and sky. The signatures of that surface, if it was only illuminated by the sun or only illuminated by the sky may be found with the following $$\rho_{sky} = \rho\left(\frac{I_{diff}}{I_{dir} + I_{diff}}\right) \qquad (20)$$

and $$\rho_{sun} = \rho\left(\frac{I_{dir}}{I_{dir} + I_{diff}}\right) \qquad (21)$$
$$= \rho\left(1 - \frac{I_{diff}}{I_{dir} + I_{diff}}\right)$$

where $\rho_{sky}$ is the surface signature illuminated only by the sky ("skylit only surface signature"), $\rho_{sun}$ is the surface signature when only illuminated by the sun ("sunlit only surface signature"), $\rho$ is the signature when fully illuminated by both sun and sky ("fully lit pixel signature"), $I_{diff}$ is the diffuse (sky) flux and $I_{dir}$ is the direct (solar) flux. In other embodiments, $\rho_{sky}$ and $\rho_{sun}$ may be calculated by multiplying $\rho$ by values that are proportional to $$\left(\frac{I_{diff}}{I_{dir} + I_{diff}}\right) \text{ and } \left(1 - \frac{I_{diff}}{I_{dir} + I_{diff}}\right),$$

respectively.

Direct and diffuse fluxes may be calculated using any suitable method. In at least one embodiment, direct and diffuse fluxes may be calculated by the single layer multiple scattering algorithm described above, where the diffuse flux may be represented as $$I_{diff} = F^-(\tau_1) \qquad (22)$$

Both sun and sky signatures may be removed from all other pixels by projection and their abundances calculated in the same way as in the standard AMGS algorithm. After the final iteration, the sum of the "sun" abundances gives the sun illumination fraction (or factor), while the sum of the "sky" abundances gives the fraction (or factor) of sky illumination. All pixels having been chosen as endmembers will end up with sun and sky fractions of exactly 1.

In this and similar embodiments, SMACC may also be used instead of AMGS but a problem may arise when the positivity constraint is enabled. This is because the constraint may be too strong, and negative abundances are permanently set to 0 as soon as they are encountered. This unnecessarily eliminates many endmembers from participating in the composition of a pixel's signature, as often, the abundance would become positive again as other endmembers are found. When the constraint is enabled, it is in fact so strong that the weaker sky contribution usually becomes zero for all pixels.

Once the sky and sun illumination fractions $f_{sky}$ and $f_{sun}$ are known, one or more pixels of the image may be corrected for illumination. A given pixel may be compensated using the direct and diffuse fluxes of the given pixel. The compensation may alternatively or additionally use a solar illumination factor and a sky illumination factor of the given pixel, the solar illumination factor being the sum of the abundances of the sunlit surface signatures and the sky illumination factor being a sum of the abundances of the skylit surface signatures of all pixels selected in the iterative process for the given pixel. In at least one embodiment, the correction of one or more pixels may involve multiplying the given pixel by a value proportional to $$\rho_{corr} = \rho_{pixel}\left(\frac{I_{dir} + I_{diff}}{f_{sun}I_{dir} + f_{sky}I_{diff}}\right) \qquad (23)$$

In at least one embodiment, the solar illumination factor may be the greater of zero and the sum of the abundances of the sunlit surface signatures and the sky illumination factor may be the greater of zero and a sum of the abundances of the skylit surface signatures of all pixels selected in the iterative process for the given pixel. This may be desirable in embodiments where there are no positivity constraints on abundances and thus some abundance may become negative. To protect from this, the sum may be set to zero if it becomes negative.

As mentioned above, FIG. 13 is a flow diagram representing a process for at least one embodiment of the present disclosure. The process starts at block 1302 and proceeds to block 1304 where the brightest pixel in terms of norm is identified. It may be assumed that this pixel is fully lit by both the sun and the sky. The process proceeds from block 1304 to block 1306 where direct (sun) and diffuse (sky) fluxes are determined for the pixel using the fluxes. The process then proceed to block 1308 where a skylit only surface signature and a sunlit only surface signature are determined for the pixel. The process proceeds to block 1310 where an abundance of each of the sunlit and skylit surface signatures in pixels in the image are determined. The sunlit and skylit surface signatures may also be removed from pixels in the image.

It is then determined at block 1312 whether to proceed to block 1304 or to block 1314. The process may proceed to block 1304 if the process has not yet performed a predetermined number of iterations of blocks 1304 to 1310, or until the norm of the pixel last identified in block 1304 is below a predetermined threshold value. Otherwise the process may proceed to block 1314 where sun and sky illumination factors are determined by summing sun abundances and summing sky abundances determined in block 1310 in all iterations for each pixel. The process then proceeds to block 1316 where one or more pixels in the image are compensated. A given pixel may be compensated using the direct and diffuse fluxes of the given pixel, as well as the sun and sky illumination factors for the given pixel. The process then proceeds to block 1318 and ends.

Figure 14:
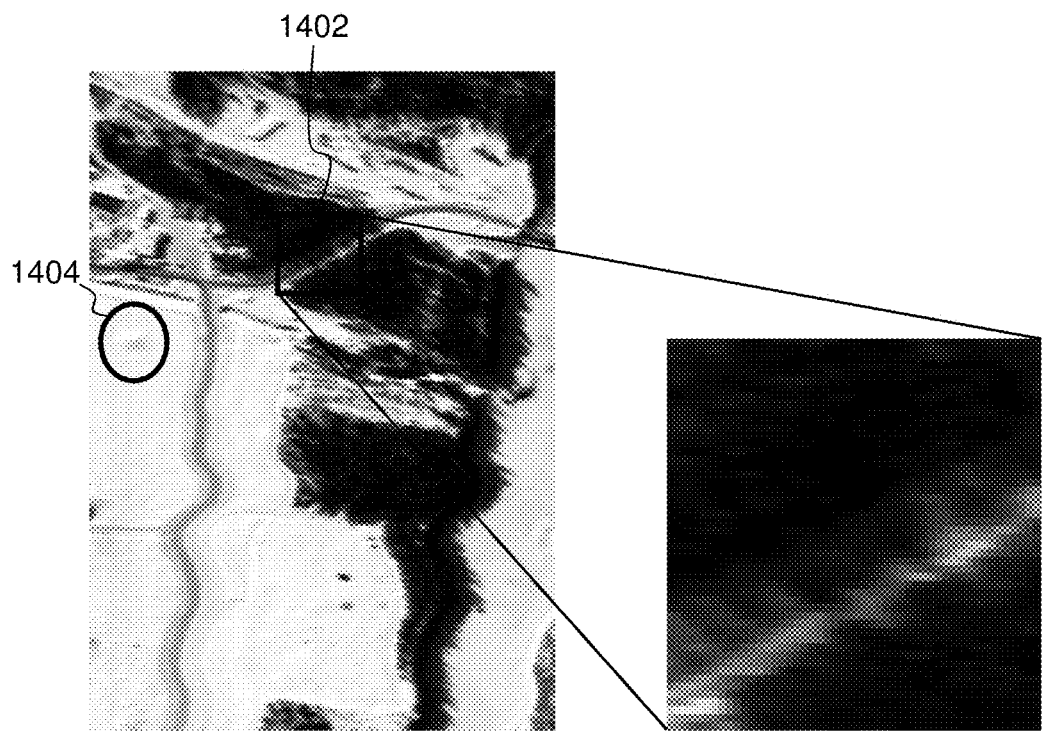
FIG. 14 is an example image prior to shadow correction.
Figure 15:
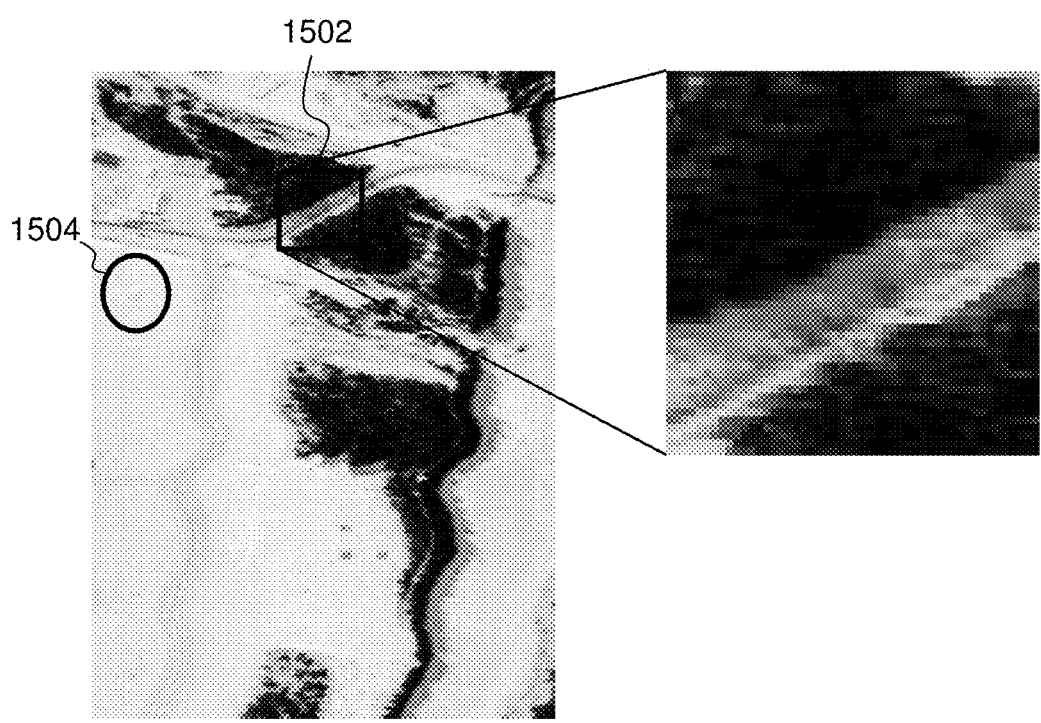
FIG. 15 is the image of FIG. 14 after shadow correction.

FIG. 14 is an example image prior to any shadow correction. FIG. 15 is the image of FIG. 14 corrected for shadows using an embodiment of the algorithm described above. Area 1402 in FIG. 14 indicates a road or path through a wooded area. In the corrected image of FIG. 15, details within the tree line shadow in the same area, area 1502, have been restored. The improvement is more easily seen in the blown-up portions of the images of FIG. 14 and FIG. 15.

In addition, areas indicated by 1404 and 1404 on the pre and post corrected images also demonstrate how variations in illumination due to terrain topography may be reduced considerably.

Figure 16:
FIG. 16 is the image of FIG. 11 after shadow correction.

As another example, FIG. 16 shows the same image used in FIG. 11 corrected for shadows. In this case, the correction performs even better than the correction shown in FIGS. 14 and 15, with the resulting image being much flatter and practically void of shadows.

The above examples illustrate the application and results of the above described method of shadow correction.

Figure 17:
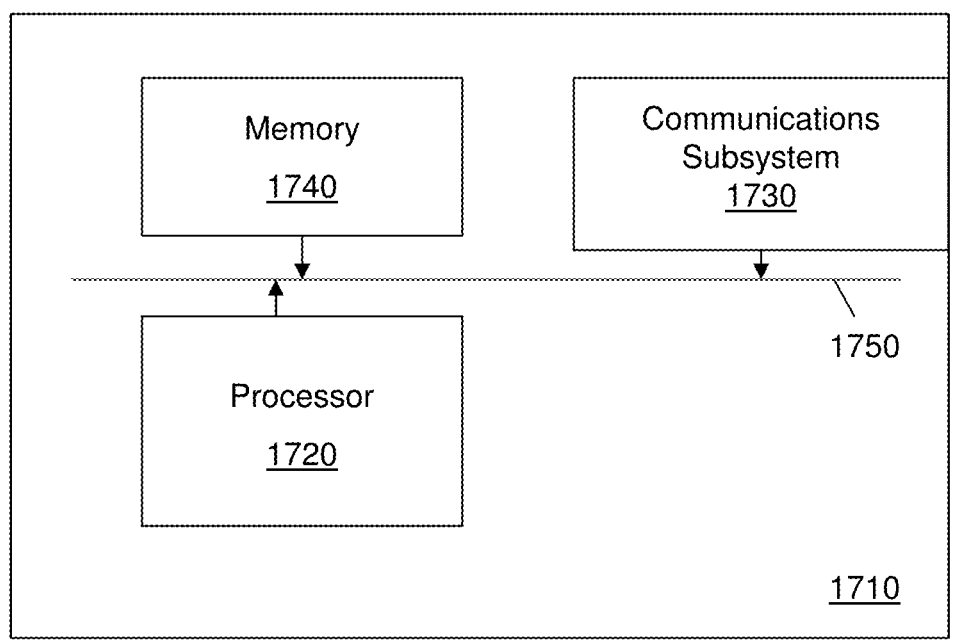
FIG. 17 is simplified block diagram of a computing device capable of performing the one or more of the methods or functions of the present disclosure.

Embodiments of the present disclosure may be performed by a computing device or group of computing devices. Reference is now made to FIG. 17, which shows an example simplified computing device that may be used.

Computing device 1710 may be a single device or group of devices and includes at least one processor 1720 to perform the one or more of the methods and functions described above. Processor 1720 in the example of FIG. 17 is a logical unit and may be comprised of one or more physical processors or chips.

Processor 1720 communicates with a memory 1740. Again, memory 1740 is logical and may be located within computing device 1710 or possibly distributed remotely from device 1710. Memory 1740 may be configured to store program code and image data, that when executed may perform one or more methods or functions of the present disclosure.

A communications subsystem 1730 allows computing device 1710 to communicate with one or more other devices, including but not limited to other computing devices, optical sensors and radiation sensors. Communication subsystem 1730 may be any wired or wireless communications subsystem and may allow communication either directly with the other devices or through any local or wide area network, such as for example the Internet.

In addition, the various components of computing device 1710 may communicate with each other, for example, through a bus 1750. However other possibilities for communication between the components exist.

Although some embodiments are described in the form of methods alone, this is not meant to be limiting. Apparatus for carrying out part or all of these methods are also contemplated.

In addition, one or more the steps, methods, algorithms or other techniques according to the present disclosure may be performed automatically, meaning without any user intervention.

The structure, features, accessories, and alternatives of specific embodiments described herein and shown in the Figures are intended to apply generally to all of the teachings of the present disclosure, including to all of the embodiments described and illustrated herein, insofar as they are compatible. In other words, the structure, features, accessories, and alternatives of a specific embodiment are not intended to be limited to only that specific embodiment unless so indicated.

Furthermore, additional features and advantages of the present disclosure will be appreciated by those skilled in the art.

In addition, the embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

Moreover, the previous detailed description is provided to enable any person skilled in the art to make or use the present invention. Various modifications to those embodiments will be readily apparent to those skilled in the art, and the generic principles defined herein may be applied to other embodiments without departing from the spirit or scope of the invention described herein. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

What is claimed:

1. A method for use in atmospheric compensation of a multi or hyper spectral image, the method comprising:
designating pixels of the image into one of at least a lower water content group and a higher water content group based on a retrieved water vapor value of each pixel;
calculating an average water vapor content value for each of the lower and higher water content groups of pixels;
calculating a gain value and an offset value for each of the lower and higher water content groups;
associating each of the average water vapor content values with the respective gain and Offset values of each of the lower and higher water content groups;
calculating gain and offset values for individual pixels of the image by interpolating or extrapolating based on the two average water vapor content values using the water vapor value of each pixel; and
compensating at least part of the image using the calculated gain and offset values of the individual pixels.

2. The method of claim 1, wherein the designating is performed based on an average water vapor content value of the entire image.

3. A non-transitory computer-readable storage medium comprising instructions for execution on one or more electronic devices, the instructions for a method for performing atmospheric compensation of a multi or hyper spectral image, the method comprising:
designating pixels of the image into one of at least a lower water content group and a higher water content group based on a retrieved water vapor value of each pixel;
calculating an average water vapor content value for each of the lower and higher water content groups of pixels;
calculating a gain value and an offset value for each of the lower and higher water content groups;
associating each of the average water vapor content values with the respective gain and offset values of each of the lower and higher water content groups;
calculating gain and offset values for individual pixels of the image by interpolating or extrapolating based on the two average water vapor content values using the water vapor value of each pixel; and
compensating at least part of the image using the calculated gain and offset values of the individual pixels.

4. The non-transitory computer readable medium of claim 3, wherein the designating is performed based on an average water vapor content value of the entire image.

5. The method of claim 2, wherein the designating based on the average water vapor content value of the entire image comprises:
designating the pixels of the image with water vapor values below the average water vapor content of the entire image to the lower water content group; and
designating the pixels of the image with water vapor values above the average water vapor content of the entire image to the higher water content group.

6. The non-transitory computer readable medium of claim 4, wherein the designating based on the average water vapor content value of the entire image comprises:

designating the pixels of the image with water vapor values below the average water vapor content of the entire image to the lower water content group; and designating the pixels of the image with water vapor values above the average water vapor content of the entire image to the higher water content group.

\* \* \* \* \*